United States Patent
Mobayed

(10) Patent No.: US 10,173,918 B2
(45) Date of Patent: Jan. 8, 2019

(54) METHOD FOR LUBRICATING MOLTEN GLASS FORMING MOLDS AND MACHINE USING SUCH MOLDS

(71) Applicant: IS Engineering AG, Zug (CH)

(72) Inventor: Carlo Mobayed, Zug (CH)

(73) Assignee: IS Engineering AG, Zug (CH)

( * ) Notice: Subject to any disclaimer, the term of this patent is extended or adjusted under 35 U.S.C. 154(b) by 0 days.

(21) Appl. No.: 15/544,258

(22) PCT Filed: Jan. 19, 2016

(86) PCT No.: PCT/IB2016/050248
§ 371 (c)(1),
(2) Date: Jul. 18, 2017

(87) PCT Pub. No.: WO2016/132236
PCT Pub. Date: Aug. 25, 2016

(65) Prior Publication Data
US 2018/0002218 A1    Jan. 4, 2018

(30) Foreign Application Priority Data
Feb. 18, 2015 (EP) .................................... 15155642

(51) Int. Cl.
*C03B 40/027* (2006.01)
(52) U.S. Cl.
CPC .................. *C03B 40/027* (2013.01)
(58) Field of Classification Search
CPC .................................................. C03B 40/027
USPC ...................................................... 65/26, 170
See application file for complete search history.

(56) References Cited

U.S. PATENT DOCUMENTS

| | | | | |
|---|---|---|---|---|
| 4,391,620 A | * | 7/1983 | Geisel | C03B 7/10 184/6.26 |
| 4,392,880 A | * | 7/1983 | Dahms | C03B 7/16 65/169 |
| 4,409,010 A | * | 10/1983 | Brown | C03B 40/027 65/170 |
| 4,648,893 A | * | 3/1987 | Roux | C03B 40/04 65/26 |
| 4,765,821 A | | 8/1988 | Doud | |
| 8,869,557 B2 | * | 10/2014 | Felgenhauer | C03B 9/403 65/26 |

(Continued)

FOREIGN PATENT DOCUMENTS

| | | |
|---|---|---|
| EP | 2105416 A2 | 9/2009 |
| WO | WO2008/084458 | 7/2008 |

*Primary Examiner* — Cynthia Szewczyk
(74) *Attorney, Agent, or Firm* — Andre Roland S.A.; Nikolaus Schibli

(57) ABSTRACT

The method for the lubrication of glass forming molds (3a,3b) with at least a nozzle (2) spraying a lubricating media in the molds comprises at least the following steps: displacement of a nozzle from a resting position to a working position into said mold (3a, 3b); movement of said nozzle in said mold while spraying with said nozzle a lubricating media to lubricate the inner surface of said mold; —) application of vacuum at least during the spraying step to evacuate emissions; —) once the mold has been lubricated, displacement of the nozzle in a resting position allowing the loading of a gob in said mold; —) circulation the lubrication media in the nozzle before and after the lubrication step to avoid stagnant lubrication media remaining in the nozzle and/or ensure constant mixing of solid particles in said media.

14 Claims, 24 Drawing Sheets

(56) References Cited

U.S. PATENT DOCUMENTS

2003/0221455 A1 4/2003 Scott et al.
2007/0277558 A1 6/2007 Boatwright et al.

\* cited by examiner

METHOD FOR LUBRICATING MOLTEN GLASS FORMING MOLDS AND MACHINE USING SUCH MOLDS

CROSS REFERENCE TO RELATED APPLICATIONS

The present application is a U.S. national stage application of PCT/IB2016/050248 filed on Jan. 19, 2016 designating the United States, and claims foreign priority to earlier European patent application No 15155642.0 filed on Feb. 18, 2015, the contents of both applications being incorporated by reference in their entirety in the present application.

FIELD OF THE INVENTION

The present invention relates to methods for lubricating forming molds on a glass container forming machine, using lubricating media that can be applied by spraying.

The present invention also concerns a mechanism suitable to carry out the method as described herein.

BACKGROUND OF THE INVENTION AND BRIEF DESCRIPTION

Typical methods and machines for lubricating molten glass forming molds are described in the publications US 2003/0221455 A1 and US 2007/0277558 A1 for example.

More specifically, glass forming molds typically comprise two halves, the two mold halves building in a closed position a glass forming mold.

The present invention relates to methods for lubricating glass forming molds where lubricating media circulates through spraying nozzles and the nozzle's supply and return lines for lubricating media.

Residue of lubricating media that remains inside the nozzle following a spraying cycle is preferably blown out of the nozzle through pressurized air. Pressurizing the inside of the nozzle prevents intrusion or entry by foreign particles or gases and cools the nozzle while not spraying.

Preferably, a spraying mechanism is used that is mounted in an alternating left-handed and right-handed version onto each section of an IS machine in order to increase the distance between two neighboring mechanisms. Two adjacent sections of an IS machine are mounted with opposing hands of the spraying mechanism.

In the present context, the notion of an IS machine is to be understood as relating to a so-called "Individual Section Machine" for forming glass containers, such as bottles, which are known per se in the field of glass container forming, an example being given in the publication WO2008084458.

The present invention further relates to a method for sucking emissions that are generated by glass forming molds lubricating process.

The method described herein uses a spraying nozzle (one or more spraying nozzles) mounted on a holder which moves into a glass forming mold. The spraying nozzle (one or more spraying nozzles) sprays lubricating media while moving up and/or down in the mold and/or neckrings. One or more spraying nozzles may be mounted on the same holder.

A gas with flame retarding characteristics may be applied as alternative to air for spraying the lubricating media in order to reduce fire hazards and prevent fire related incident A vacuum is preferably applied in the area where emissions are generated by the lubricating process, allowing the emissions to be sucked. Vacuum nozzles can be mount on the same holder on which mold lubricating nozzles are mounted or on an extra holder for vacuum nozzles. The vacuum nozzle holder can be statically mounted or can be mounted on a mechanism moving the vacuum nozzle holder from a waiting to a working position.

The invention is especially suitable for:
Accomplishing consistent mold lubrication in order to improve the quality of production
Preventing lubricating media from disintegrating while stagnant for too long or while waiting to be sprayed during the lubrication cycle. Circulating lubricating media through the spraying nozzles supply lines can be continuous or intermittent.
Cooling spraying nozzles by lubricating media circulating through the spraying nozzle supply lines continuously or intermittently and circulating the same way through the spraying nozzle.
Evacuating residues of lubricating media that remain inside of the nozzle following a spraying cycle which are blown out of the nozzle through pressurized air in order to prevent the jamming or blockage of the nozzle. Pressurizing the inside of the nozzle also prevents intrusion or entry by foreign particles or gases and cools the nozzle while not spraying.

The invention relates also to a spraying mechanism mounted on the outer blank side of section, onto or next to the blank bracket of an IS machine
The alternating sequence in mounting the spraying mechanism in left and right handed versions increases the opening distance between two neighboring mechanisms, hence facilitating easier access to the IS machine section for job change, maintenance or repair.
The invention relates to new methods for sucking gas emissions generated by the mold lubricating process. The invention is especially suitable to accomplish:
A reduction of unwanted deposits and contamination of the machine. Such deposits consist largely of inflammable matter and thus present a fire hazard.
To extract fumes that may constitute a health- and/or environmental hazard.
The present invention provides technical means to,
continuously circulate the lubricating media in order to avoid jamming or blockage of the nozzle, pump, valves, piping, tank and other system components and ensure the continuous mixing of the lubricating media media which contains solid particles (graphite)
Use of left and right handed versions of the spraying mechanism to increase the opening distance between two neighboring mechanisms on an IS machine
Blow out residual lubricating media and apply pressurized air into the nozzle between spraying cycles to cool nozzle while exhausting through nozzle openings
Vacuum or suction of emissions generated by the lubricating process, without applying a physical cover over the molds and without interfering with the gob loading path
Use a flame retarding gas instead of normal air for the spraying action, in order to avoid the hazard of fire after the spraying.

In one embodiment, the invention concerns a method for the lubrication of glass forming molds with at least a nozzle spraying a lubricating media in the molds, wherein the method comprises at least the following steps:

displacement of a nozzle from a resting position to a working position into said mold;

movement of said nozzle in said mold while spraying with said nozzle a lubricating media to lubricate the inner surface of said mold;

application of vacuum at least during the spraying step to evacuate emissions;

once the mold has been lubricated, displacement of the nozzle in a resting position allowing the loading of a gob in said mold;

circulation the lubrication media in the nozzle before and after the lubrication step to avoid stagnant lubrication media remaining in the nozzle and/or ensure constant mixing of solid particles in said media.

In one embodiment, the lubricating media may be sprayed with air under pressure (27).

In one embodiment, the spraying step is executed while moving the nozzle upwards or downwards or in a combination of both directions in the mold. Other movements may be added, for example lateral movements. All movements may be carried out sequentially or in combination.

In one embodiment, a gas with flame retardant characteristics may be used in place of air or in combination with air.

In one embodiment, residues of lubricating media remaining in the nozzle are preferably blown out via air under pressure. The blowing action may also prevent intrusion by foreign particles and further allows a cooling of the nozzle.

In one embodiment, vacuum is applied also during a gob loading step.

In an embodiment, the present invention concerns a nozzle for the lubrication of glass forming molds, wherein said nozzle comprises at least a supply line and a return line for the lubrication media, a nozzle head with an exhaust for spraying of the lubrication media and a piston that can be moved in a least a first position and in a second position, whereby in the first position the piston closes the nozzle head for the lubricating media so that the media remains in a closed circuit in the nozzle between the supply line and the return line and whereby in the second position, the piston opens the head for the lubricating media so that said media can be sprayed by the nozzle in a mold.

In one embodiment, the nozzle comprises an air supply for cleaning and cooling of said nozzle.

In one embodiment, an air supply is preferably used for the spraying operation of the lubricating media.

In one embodiment, the piston is displaced in a first and a second positions by air under pressure.

In one embodiment the invention concerns a spraying mechanism for an IS machine wherein the mechanism comprises at least a nozzle as defined herein.

In one embodiment, the mechanism is left-handed or right handed.

In one embodiment, the invention concerns an IS machine for forming glass containers, such as bottles, comprises at least a nozzle as defined herein or a spraying mechanism as defined herein and a mold for form a container in accordance with the principles and methods described herein.

In an embodiment, in the IS machine the spraying mechanisms are left-handed and right handed and mounted in an alternate sequence in each section of the machine to increase the neighboring distance between each spraying mechanism.

BRIEF DESCRIPTION OF DRAWINGS

FIGS. 14 through 24 show the movements of the lubricating mechanisms, LEFT-HANDED and RIGHT-HANDED version, starting from a waiting position and back to waiting position, step by step.

Description is made on blank molds only. Same working and cooling principle of spraying nozzle can also be applied to lubricate blow molds.

Concept is shown in a double gob (mold) configuration but same concept can be used in single or multiple gob (mold) configurations.

External vacuum pump or fan system is not part of this invention and is not shown in the figures.

The driving and motion profile of the spraying mechanism is not part of this invention.

Lubricating media circulating system is not specifically shown in FIGS. 1 to 7. Spraying nozzle is shown schematically in those figures.

Air supplies to pneumatic cylinder and lubricating media spraying air are shown in detail views of spraying nozzle only.

Figure 1:
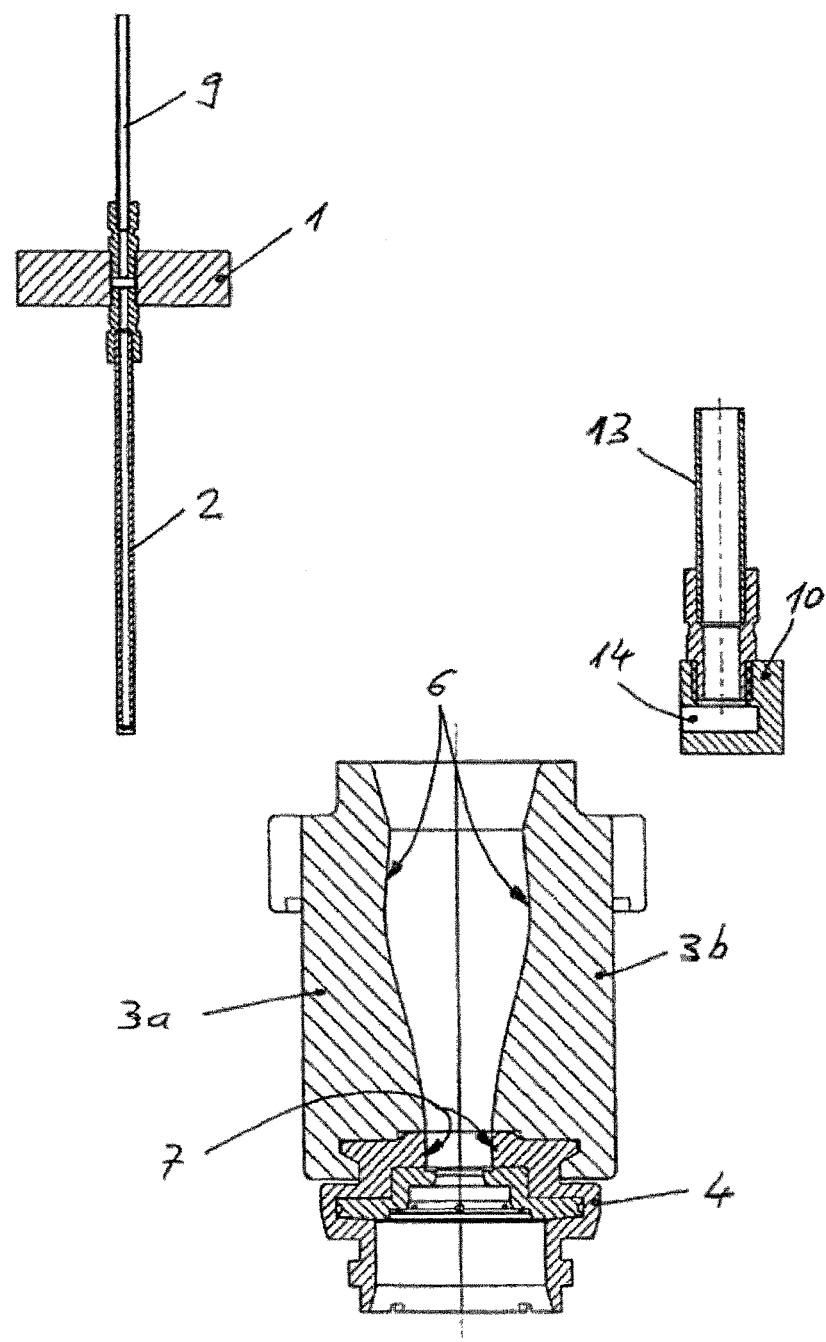
FIGS. 1 through 11 show forming mold lubrication by injection lance, spraying while moving up and/or down.

FIG. 1. Shows mold lubrication method with lubricating and sucking accessories in waiting position and with forming molds in a cut view taken perpendicularly to the longitudinal axis of the machine.

Figure 2:
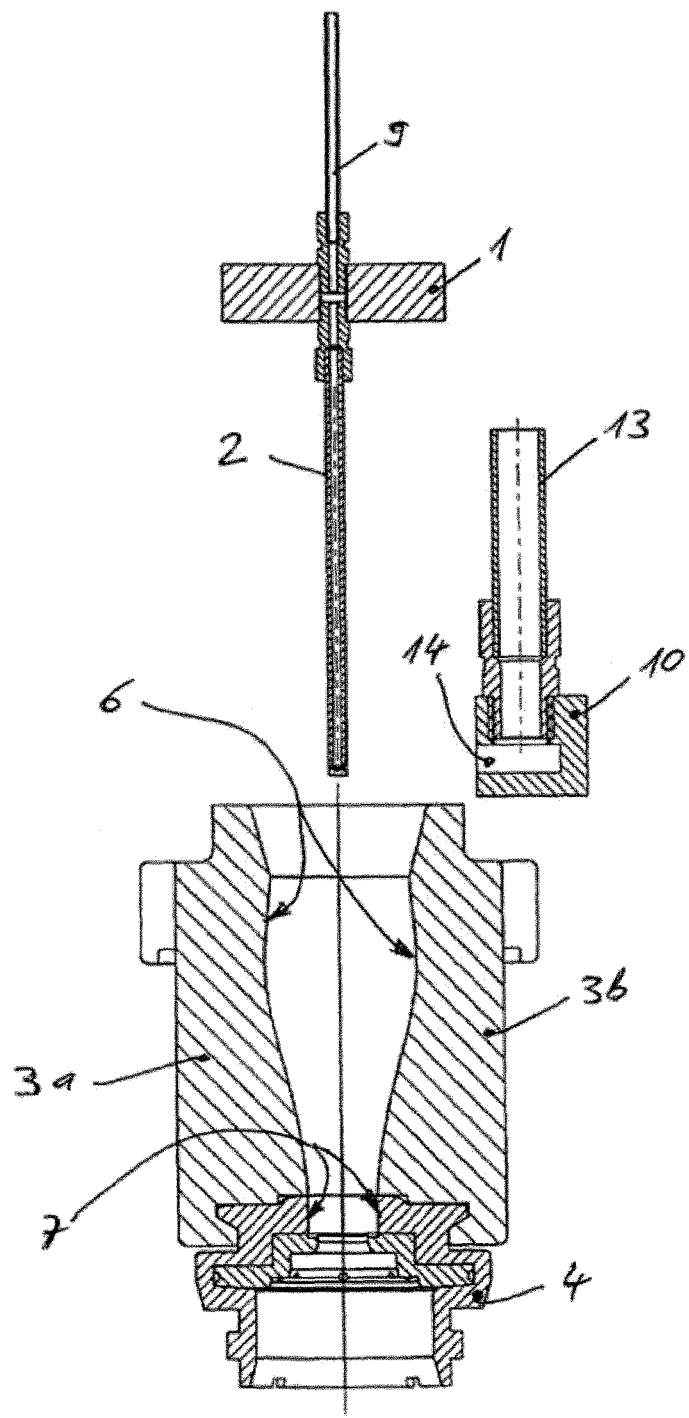

FIG. 2. Shows mold lubrication with lubricating nozzles moved on top of forming mold and sucking nozzle moved to working position where emissions generated by the mold lubricating process can be sucked and with forming molds. The cut view is taken in the same plane as FIG. 1

Figure 3:
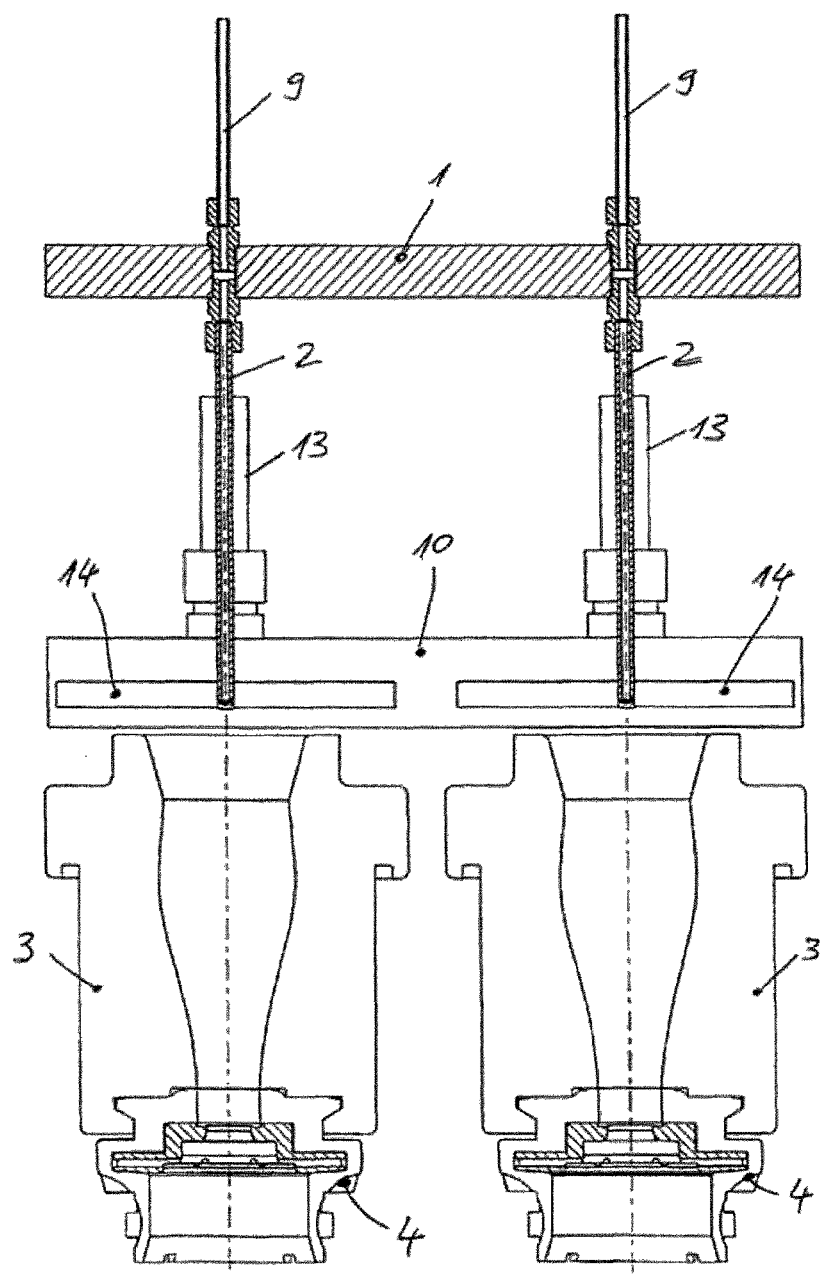

FIG. 3. Shows a partial cut view of FIG. 2 in double gob configuration, in the longitudinal axis of the machine.

Figure 4:
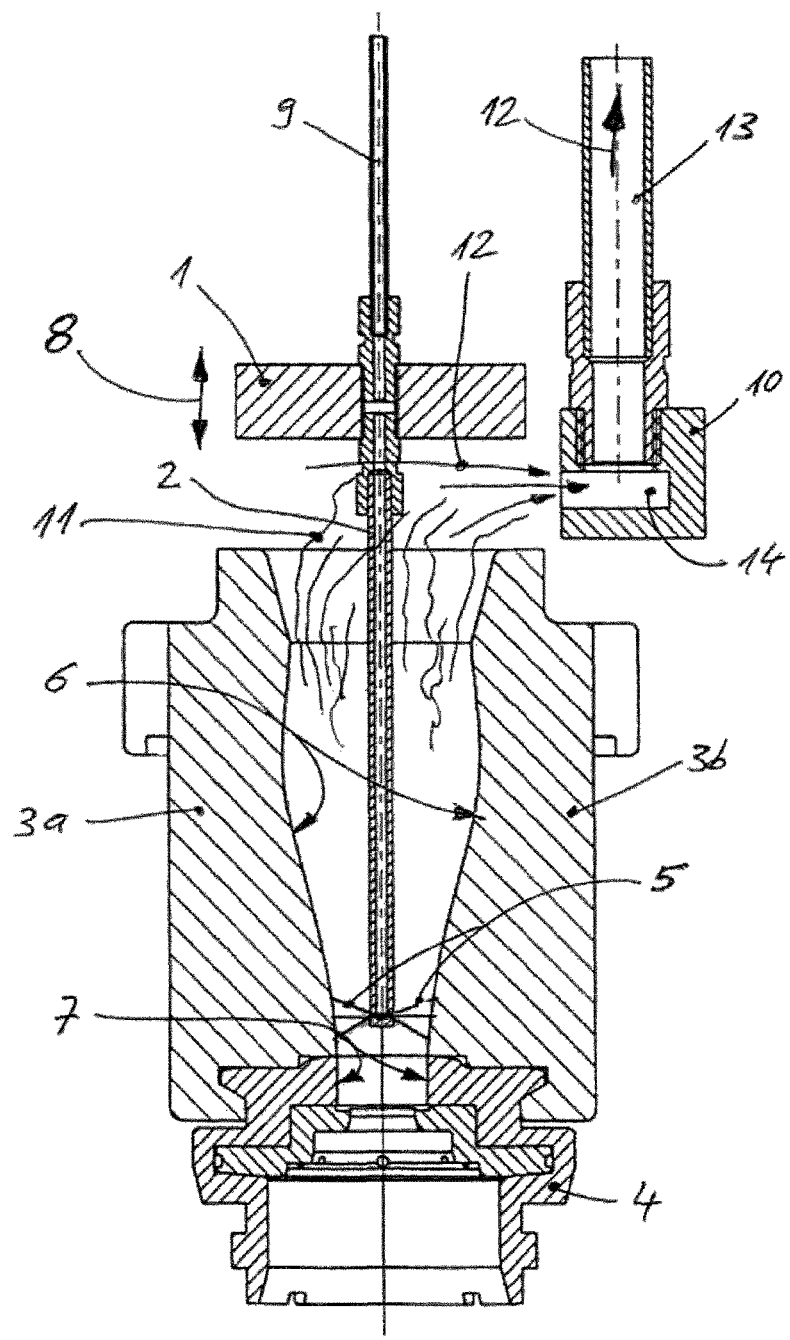

FIG. 4. Shows mold lubrication with the lubricating nozzle moved into the mold and spraying lubricating media. Sucking system is activated.

Figure 5:
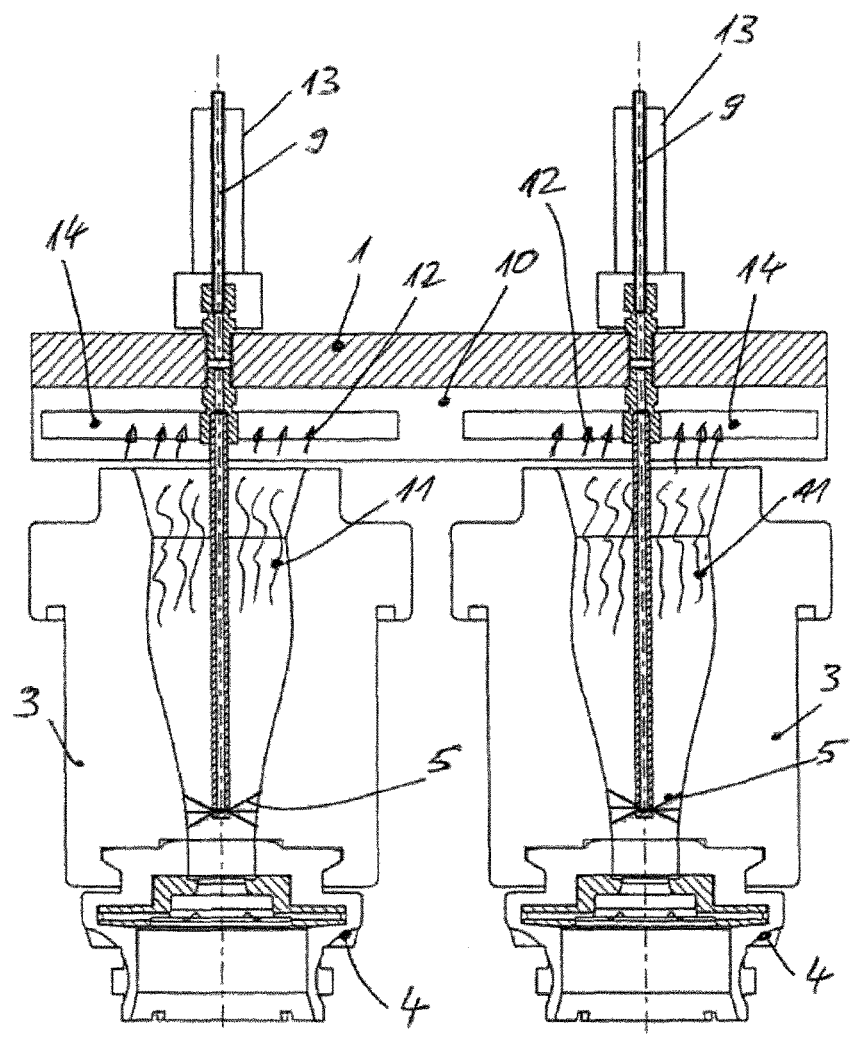

FIG. 5. Shows a partial cut view of FIG. 4. in double gob configuration as FIG. 3.

Figure 6:
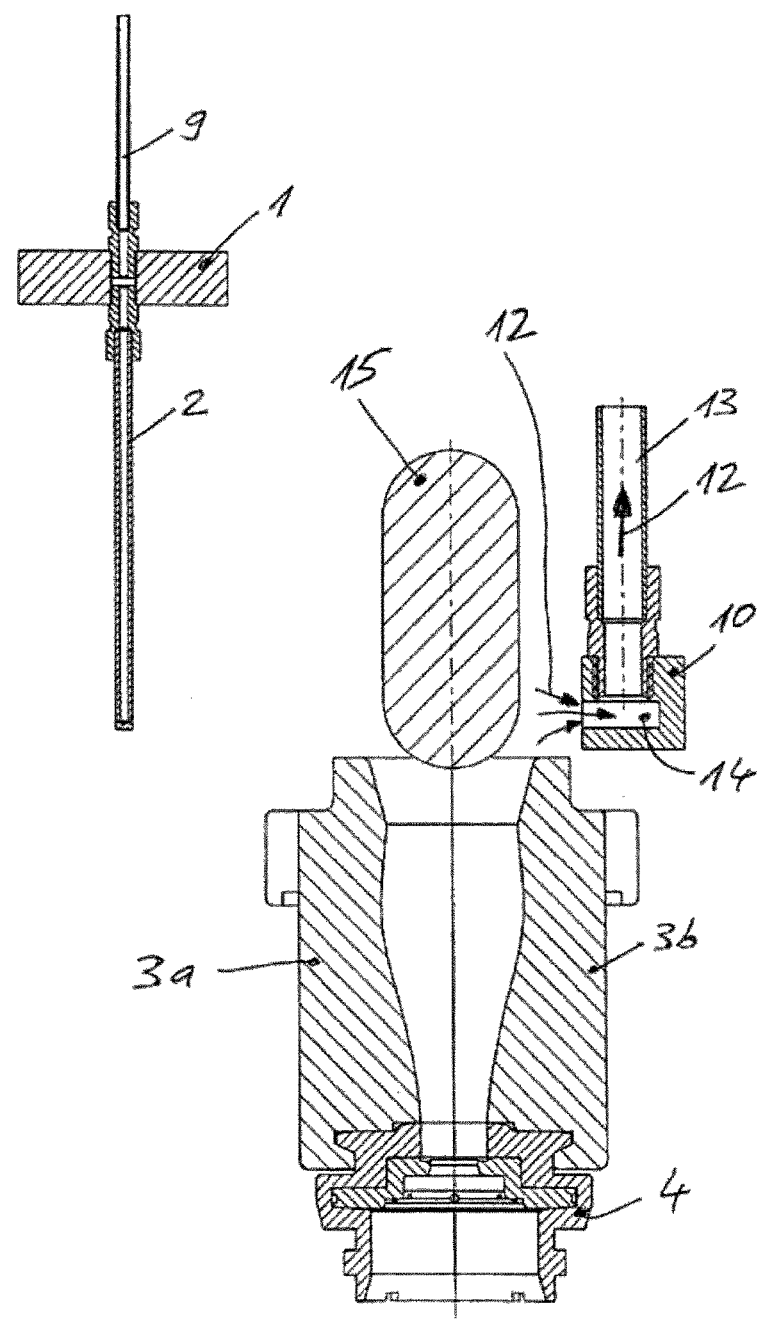

FIG. 6. Shows mold lubrication with lubricating nozzle moved to waiting position, sucking nozzle in working position activated and with a gob being loaded into the forming mold.

Figure 7:
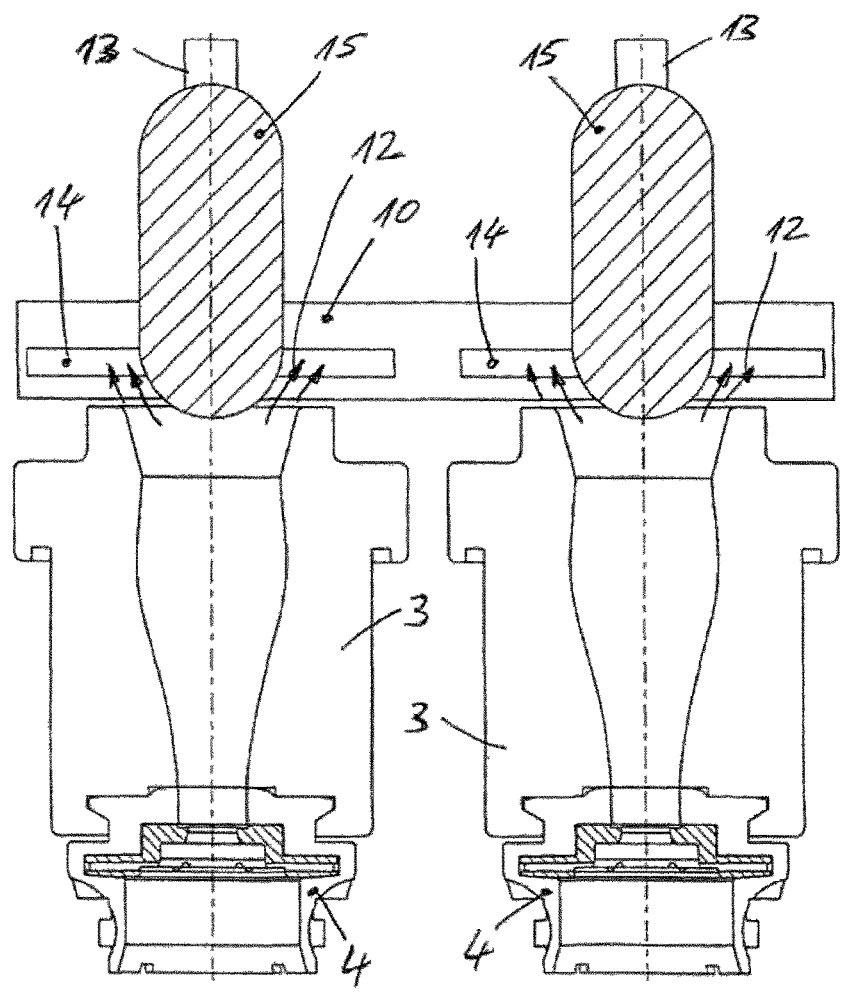

FIG. 7. Shows a partial cut view of FIG. 6. in double gob configuration as in FIGS. 3 and 5.

Figure 8:
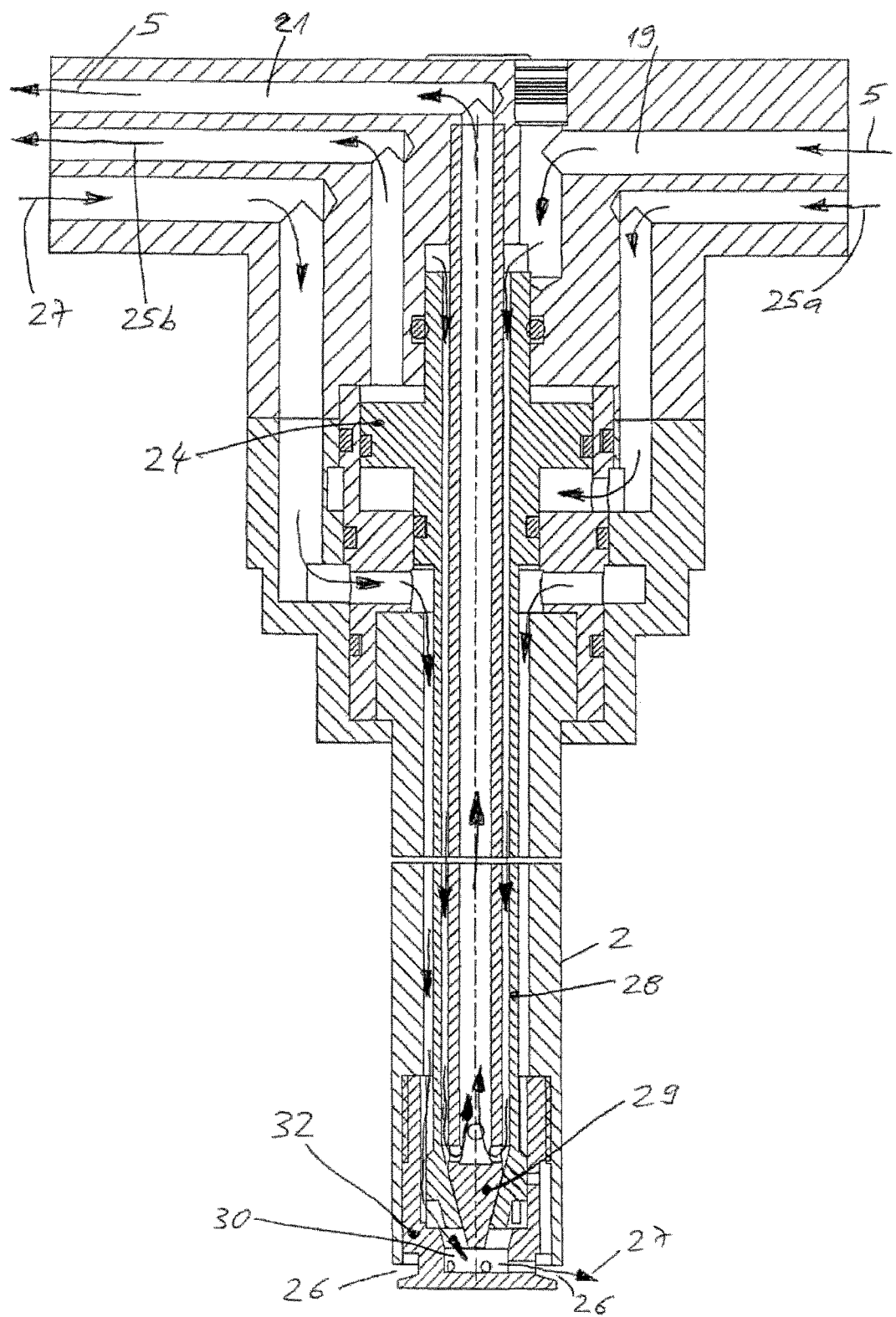

FIG. 8. Shows a cross section of spraying nozzle in closed (off) position and media supply to lubricating nozzle and actuating cylinder. Lubricating media circulating system through nozzle assembly shown open.

Figure 9:
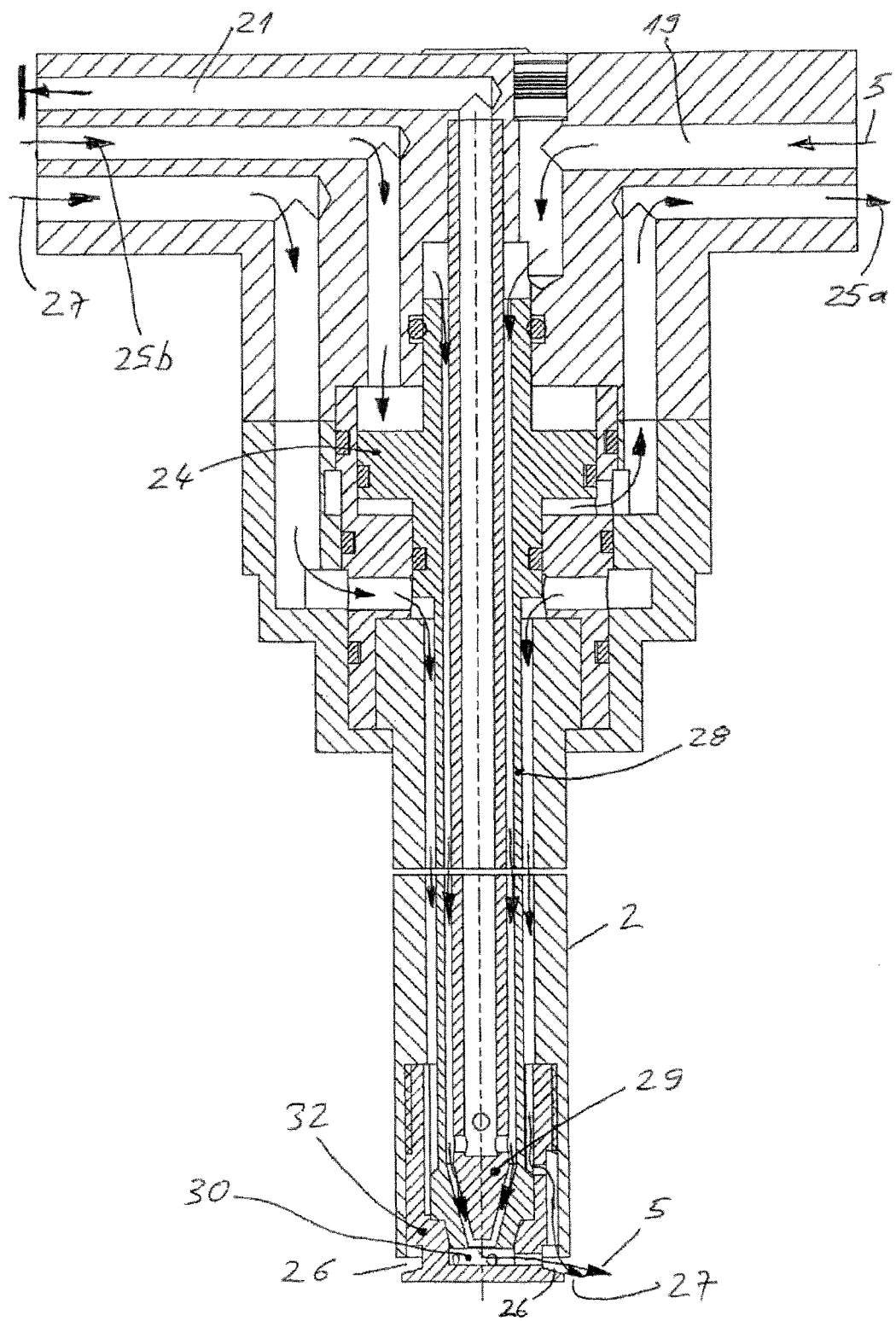

FIG. 9. Shows a cross section of spraying nozzle in open (on) position and media supply to lubricating nozzle and actuating cylinder. Lubricating media circulating system through nozzle assembly shown closed.

Figure 10:
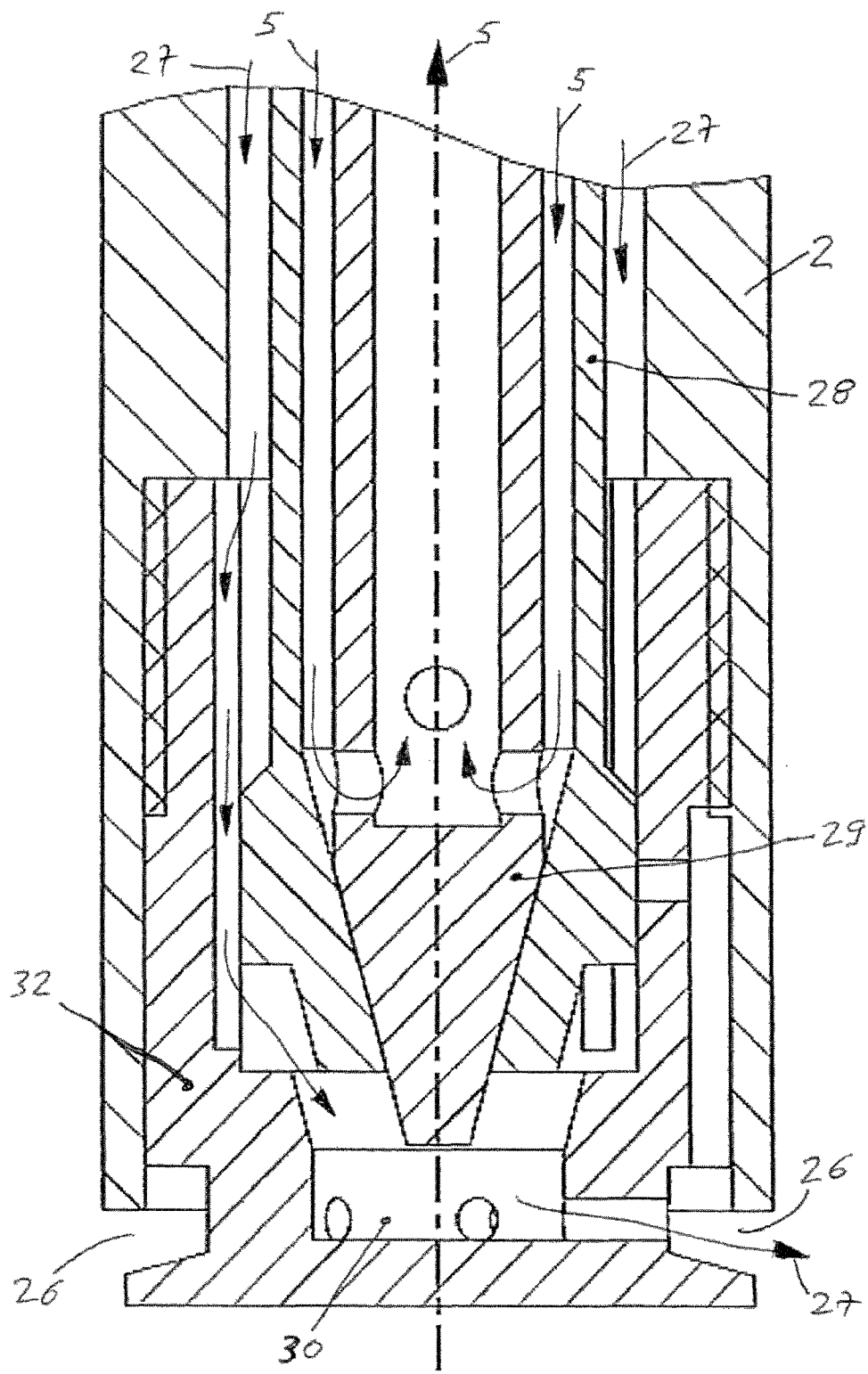

FIG. 10. Shows a cross section of spraying nozzle Head in closed (off) position (detail view of FIG. 8). Lubricating media circulating system through nozzle head shown open.

Figure 11:
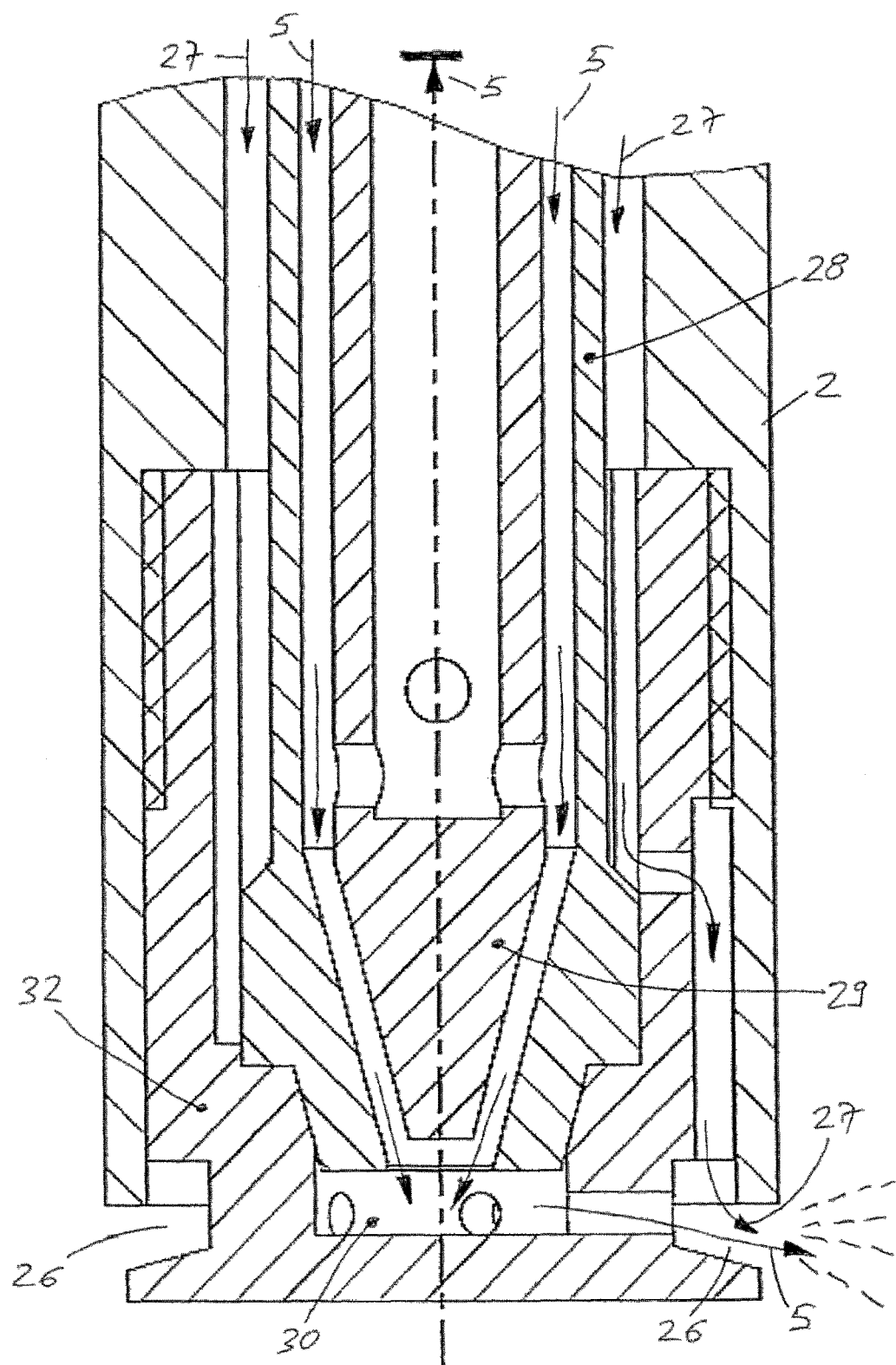

FIG. 11. Shows a cross section of spraying nozzle Head in open (on) position (detail view of FIG. 9). Lubricating media circulating system through nozzle head shown closed.

Figure 12:
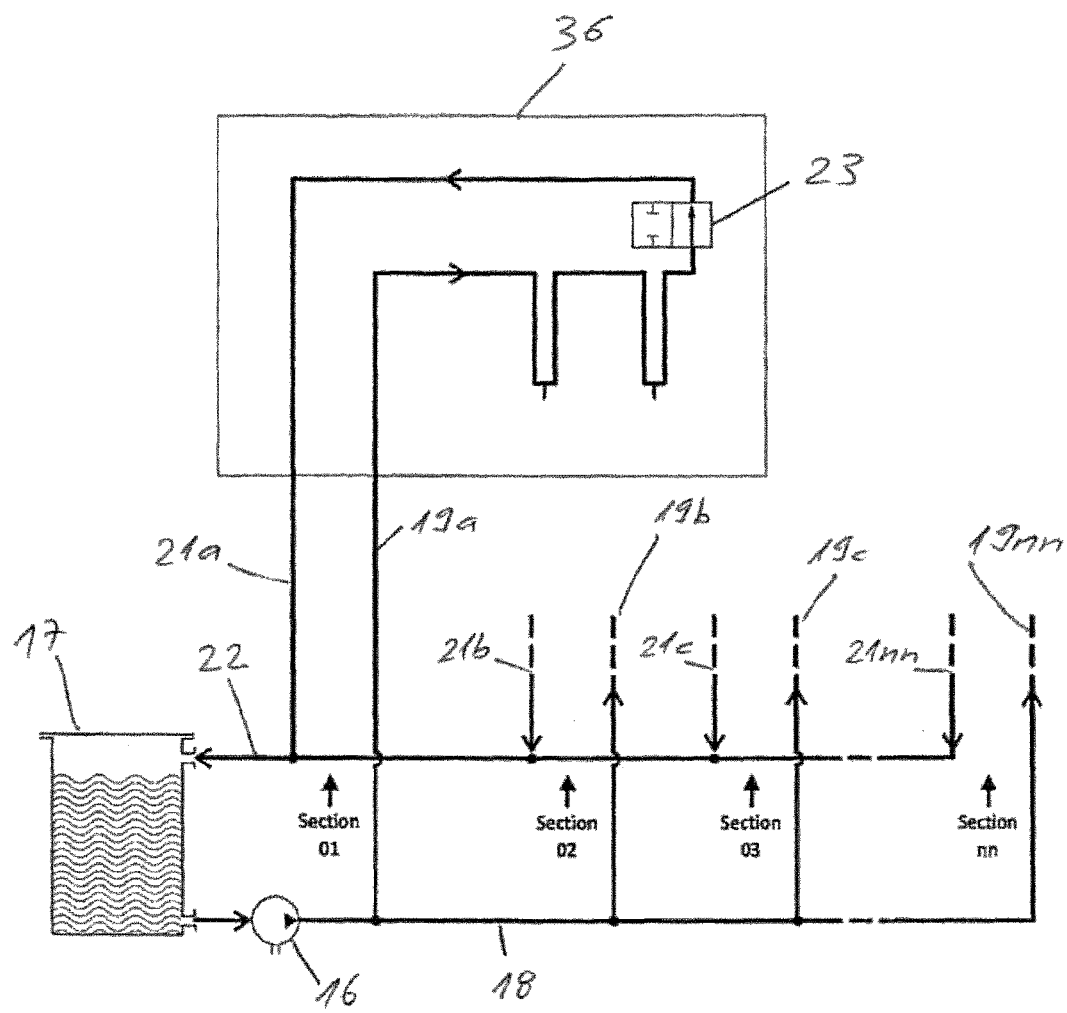
FIGS. 12 and 13 show a schematic of lubricating media supply and return arrangement

FIG. 12. Shows a schematic of lubricating media supply and return arrangement. Spraying is turned off and lubricating media return line is open.

Figure 13:
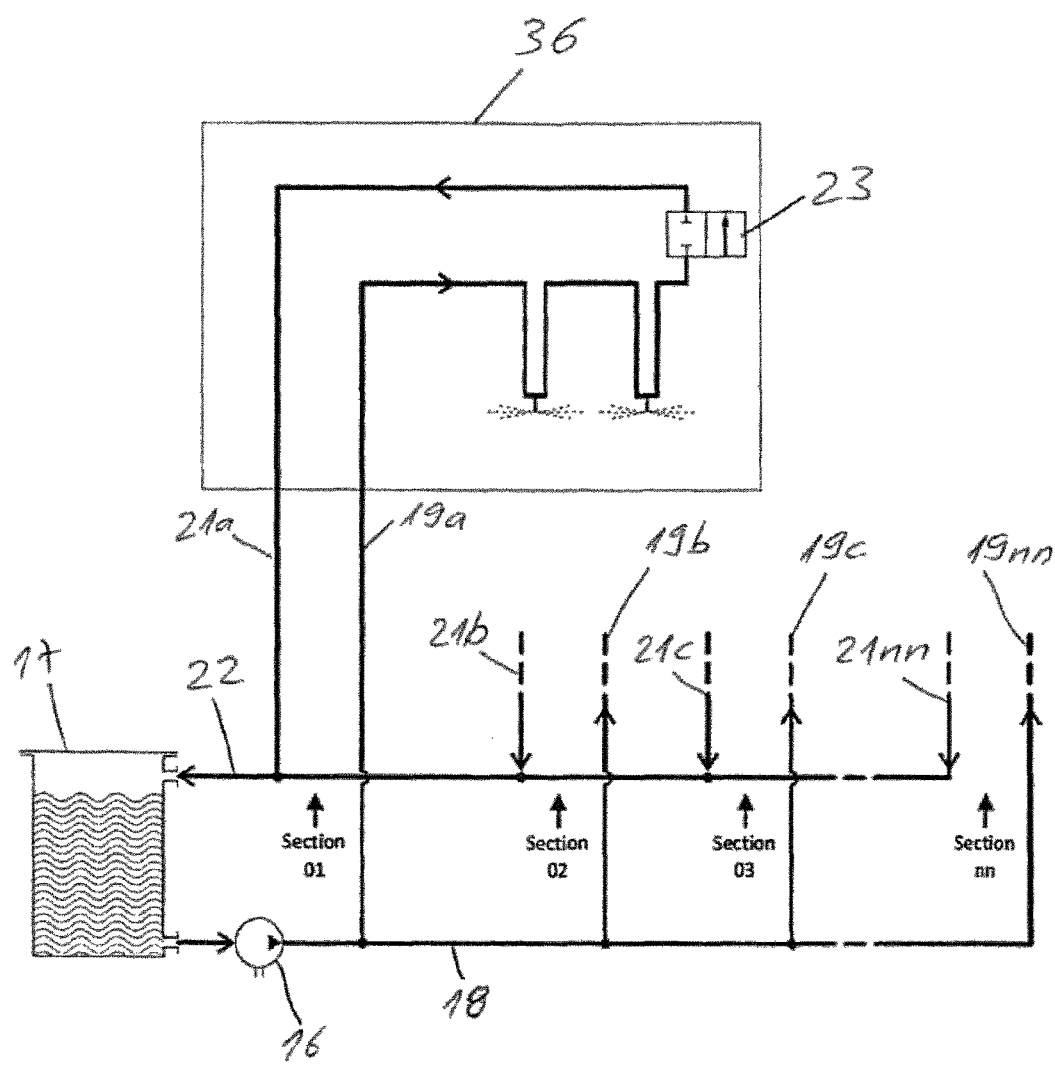

FIG. 13. Shows a schematic of lubricating media supply and return arrangement. Spraying is turned on and lubricating media return line is closed.

Figure 14:
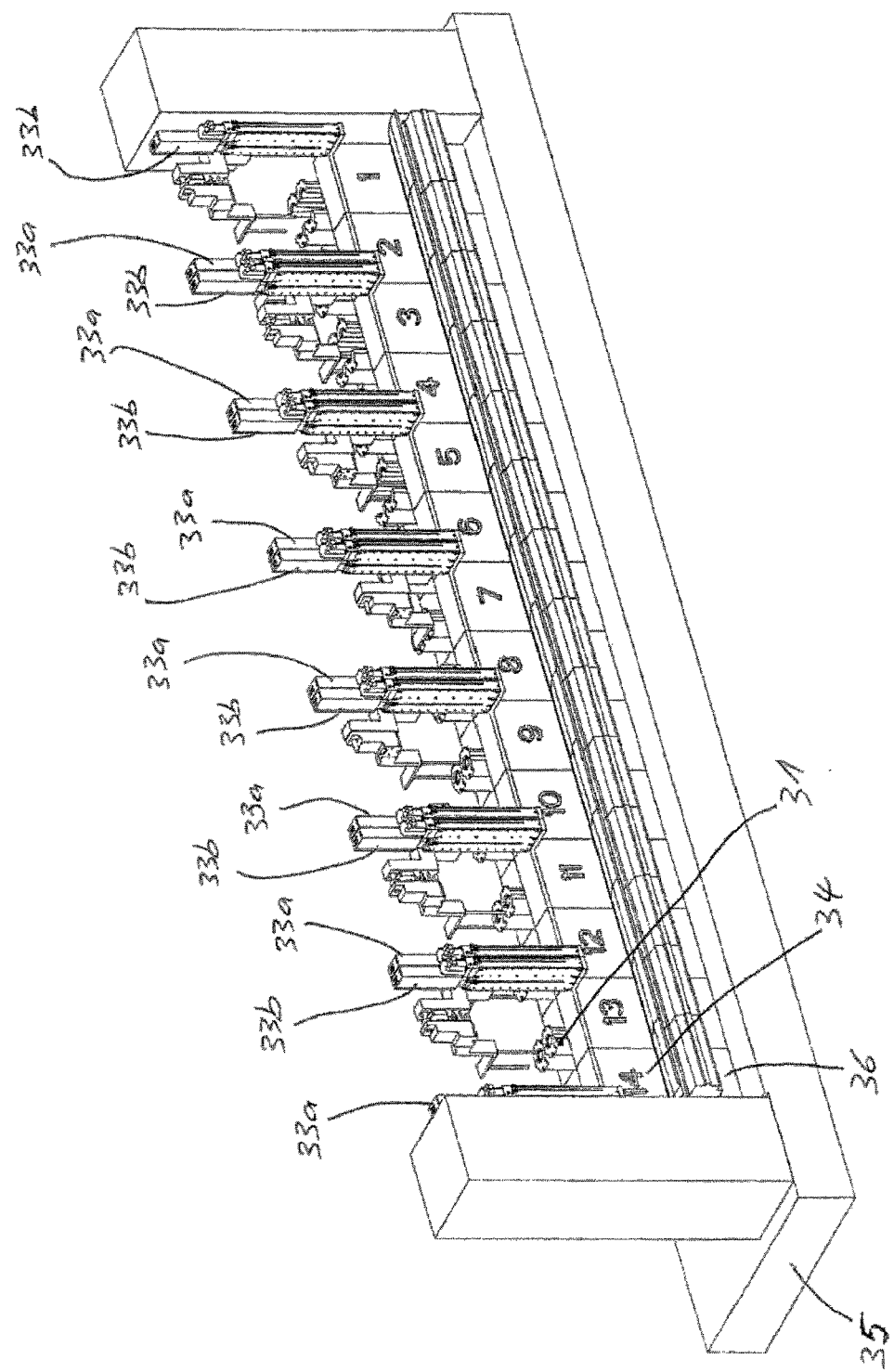
FIGS. 14 through 24 show where the lubricating mechanism is mount on the machine, a LEFT-HANDED and a RIGHT-HANDED version of mechanism.

FIG. 14. Shows a 3D view of an IS machine from the Blank side where spraying mechanisms are mounted FIG. 15. Shows a 3D view of an IS machine from opposite the Blank side with spraying mechanisms mount.

Figure 16:
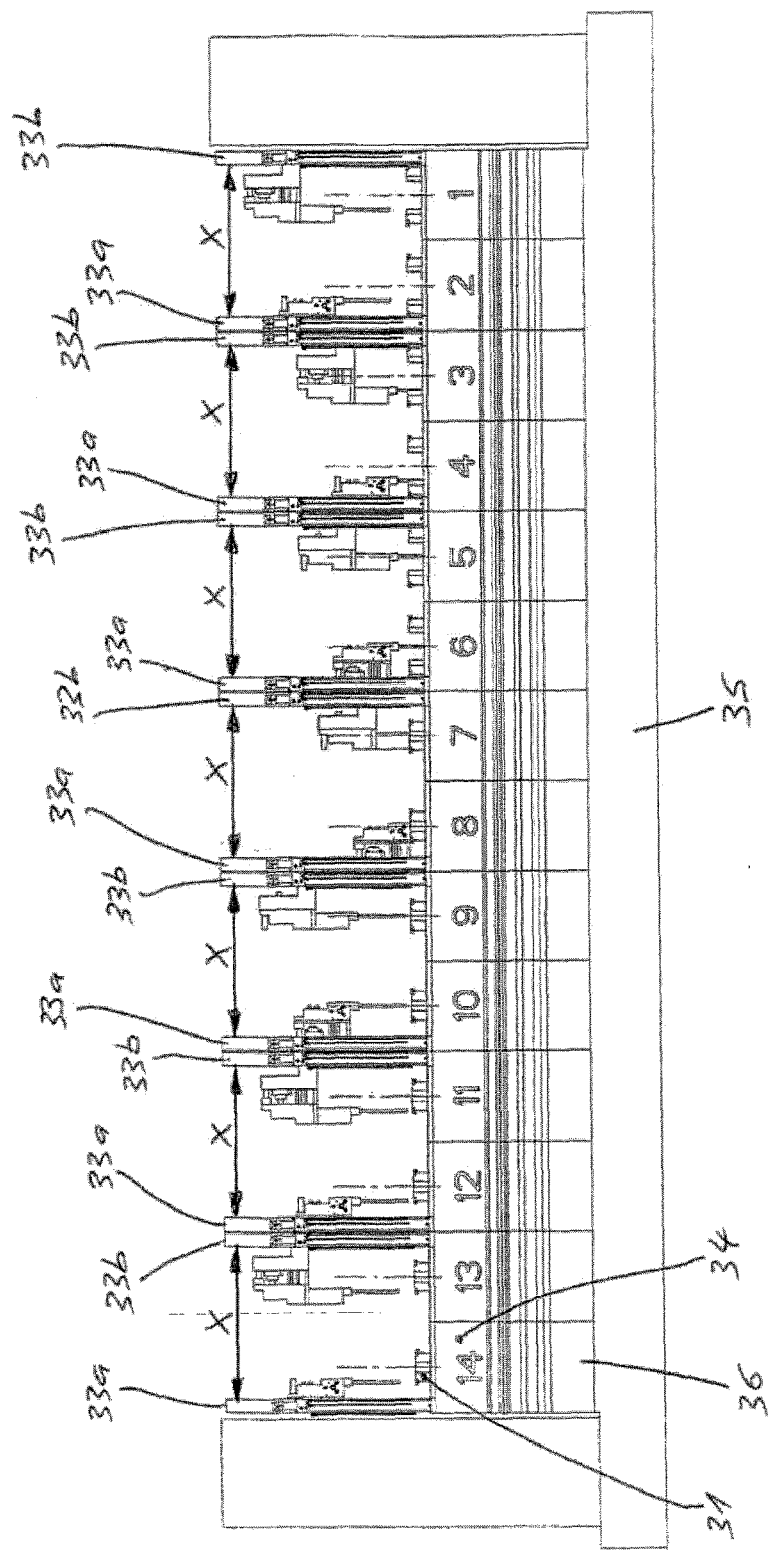

FIG. 16. Shows the IS machine from Blank side with left-handed and right-handed versions of spraying mechanisms mounted.

Figure 17:
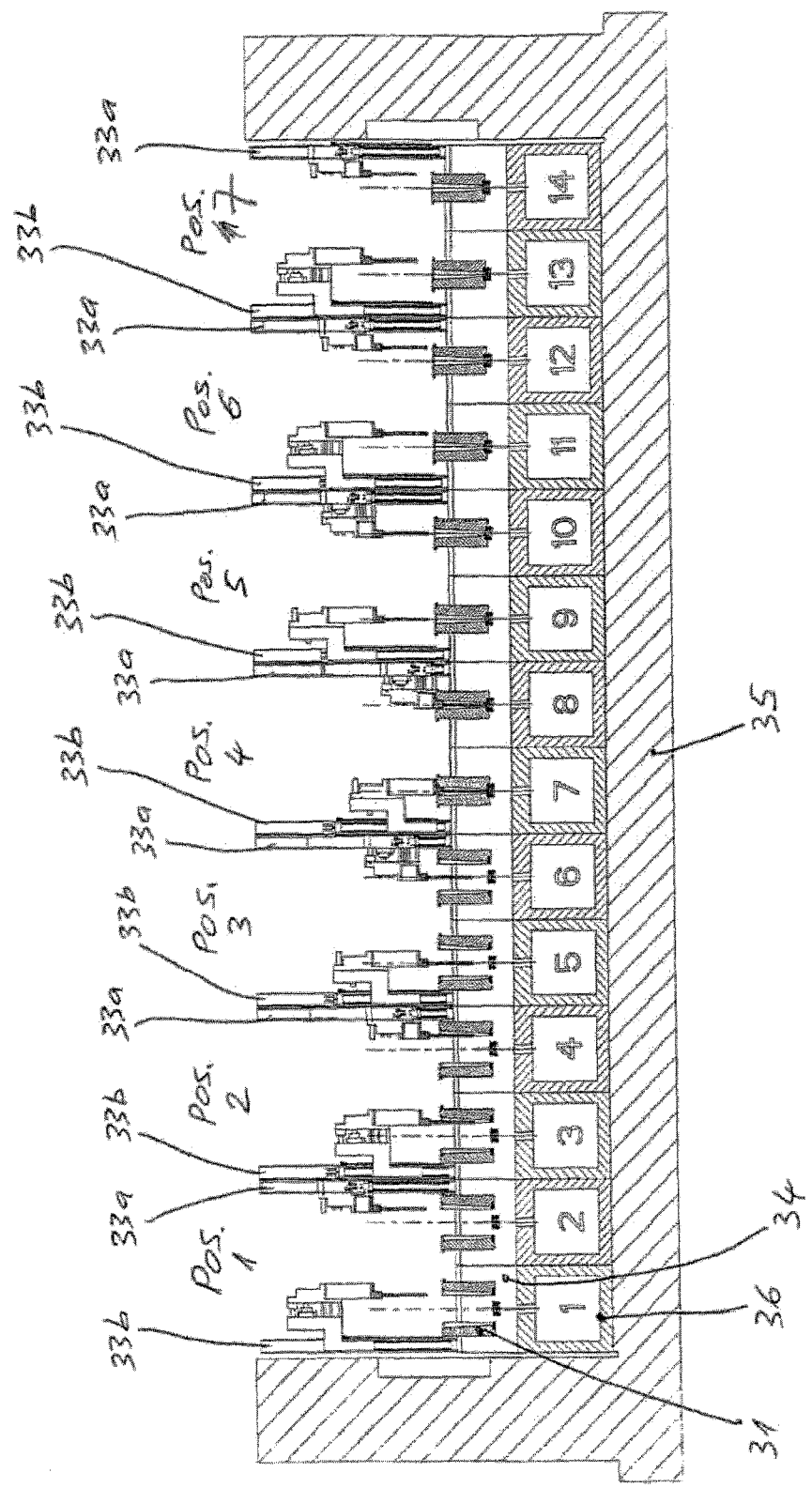

FIG. 17. Shows a cross section through blank molds of an IS machine from "inside" with spraying mechanisms mount.

Figure 18:
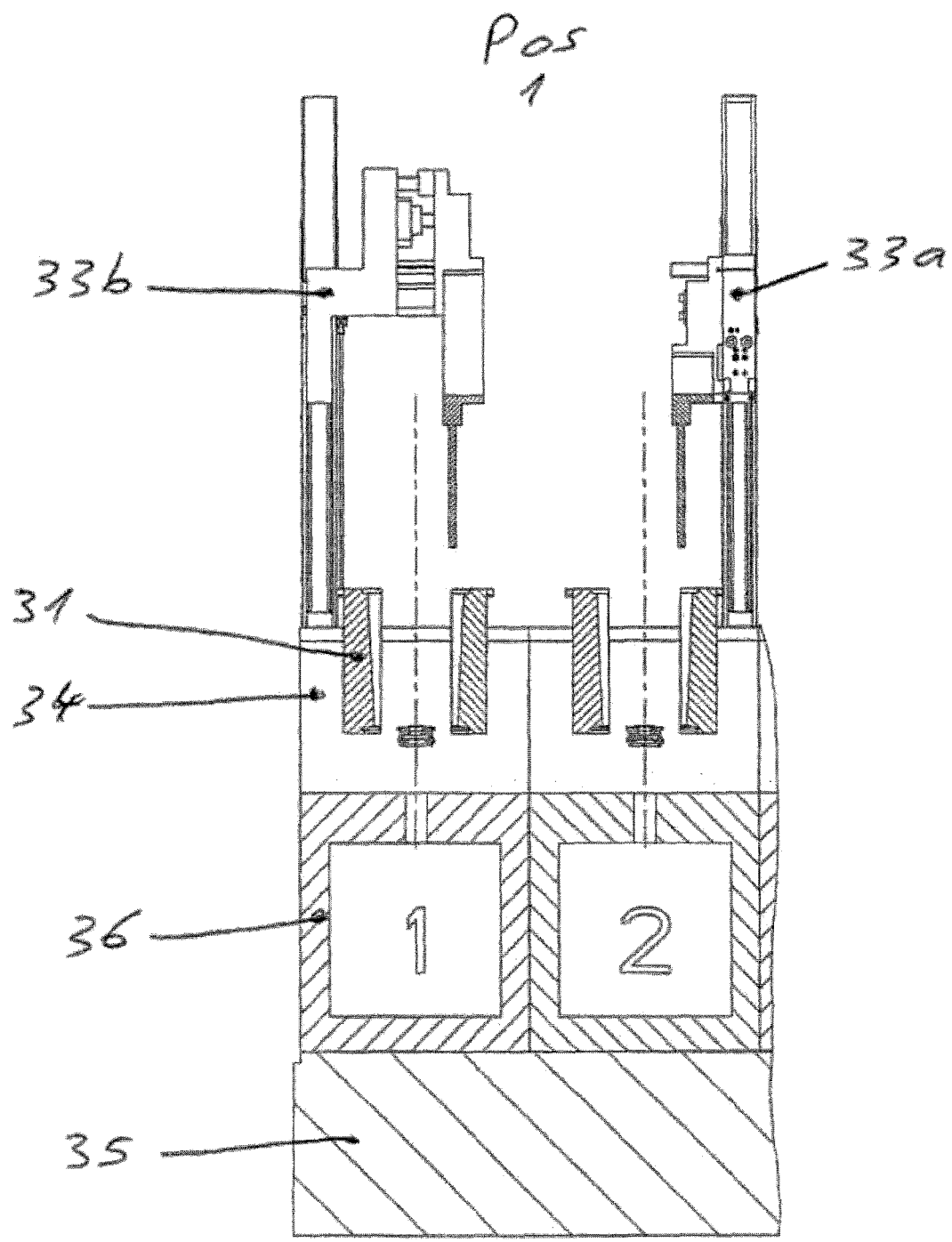

FIG. 18. Shows a detail view of sections 1+2 with spraying nozzles in waiting position. Spraying, mold lubrication is off.

Figure 19:
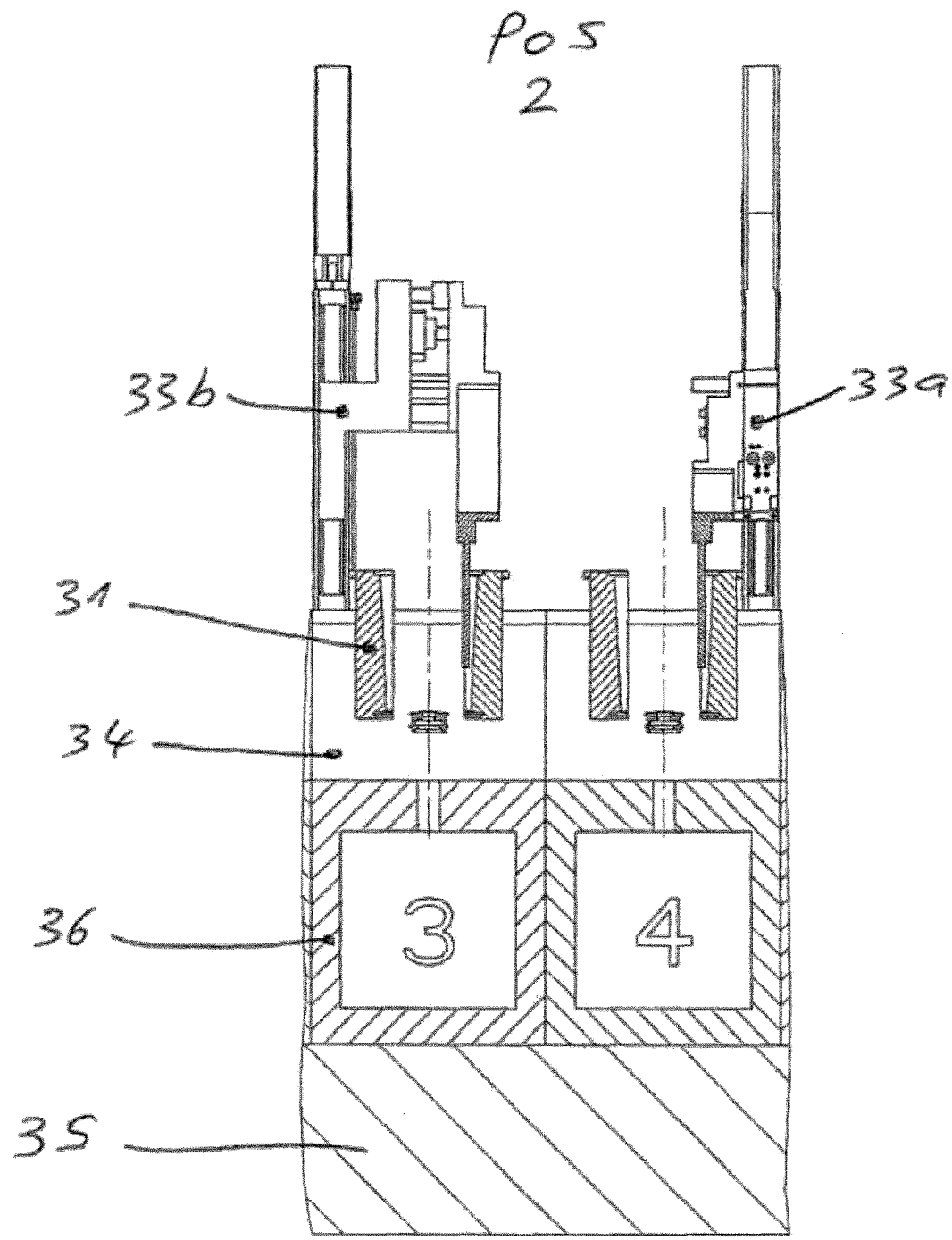

FIG. 19. Shows a detail view of sections 3+4 with spraying nozzles moved down vertically between molds. Spraying, mold lubrication is off.

Figure 20:
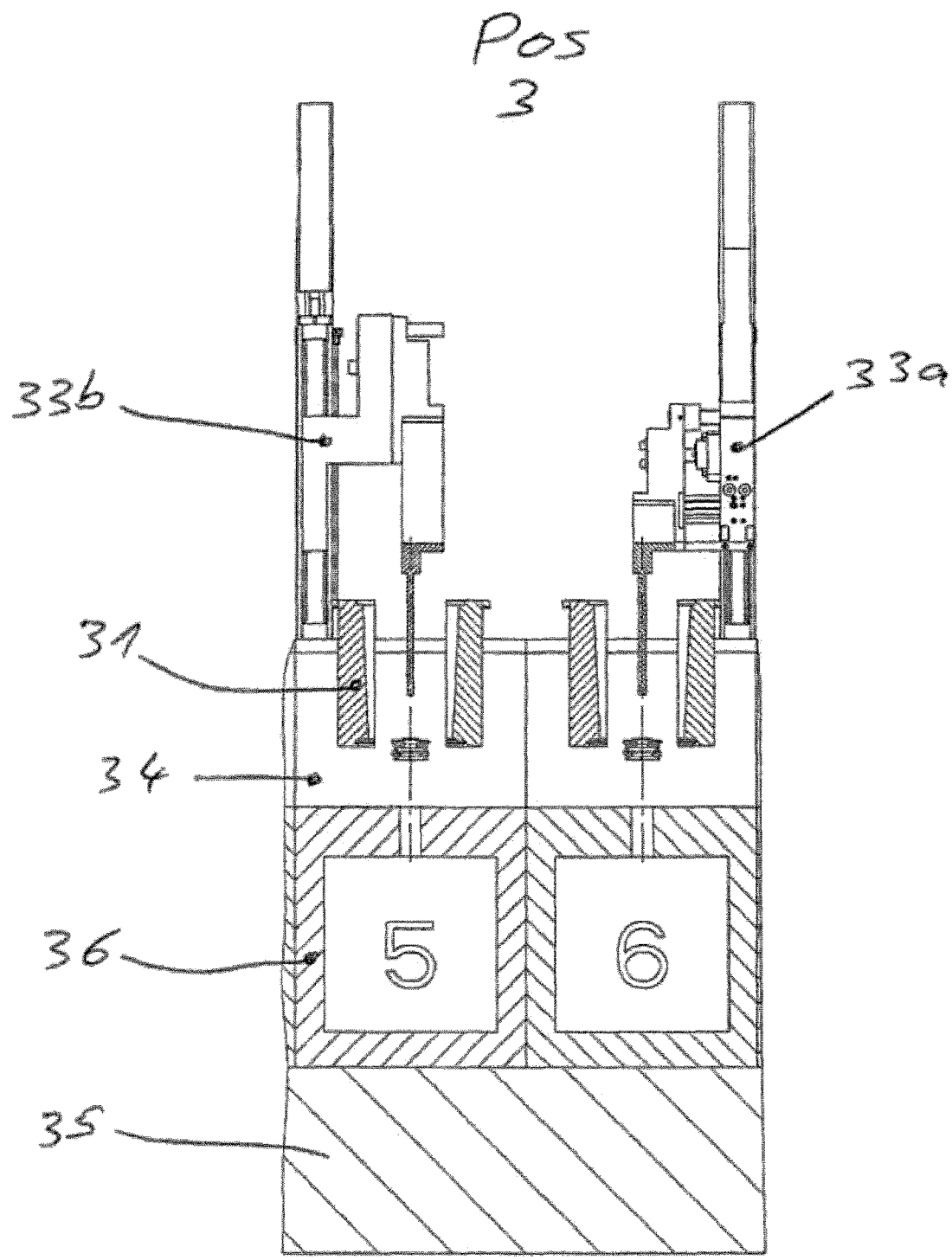

FIG. 20. Shows a detail view of sections 5+6 with spraying nozzles moved horizontally to the center of closed position of mold halves. Molds are in open position. Spraying, mold lubrication is off.

Figure 21:
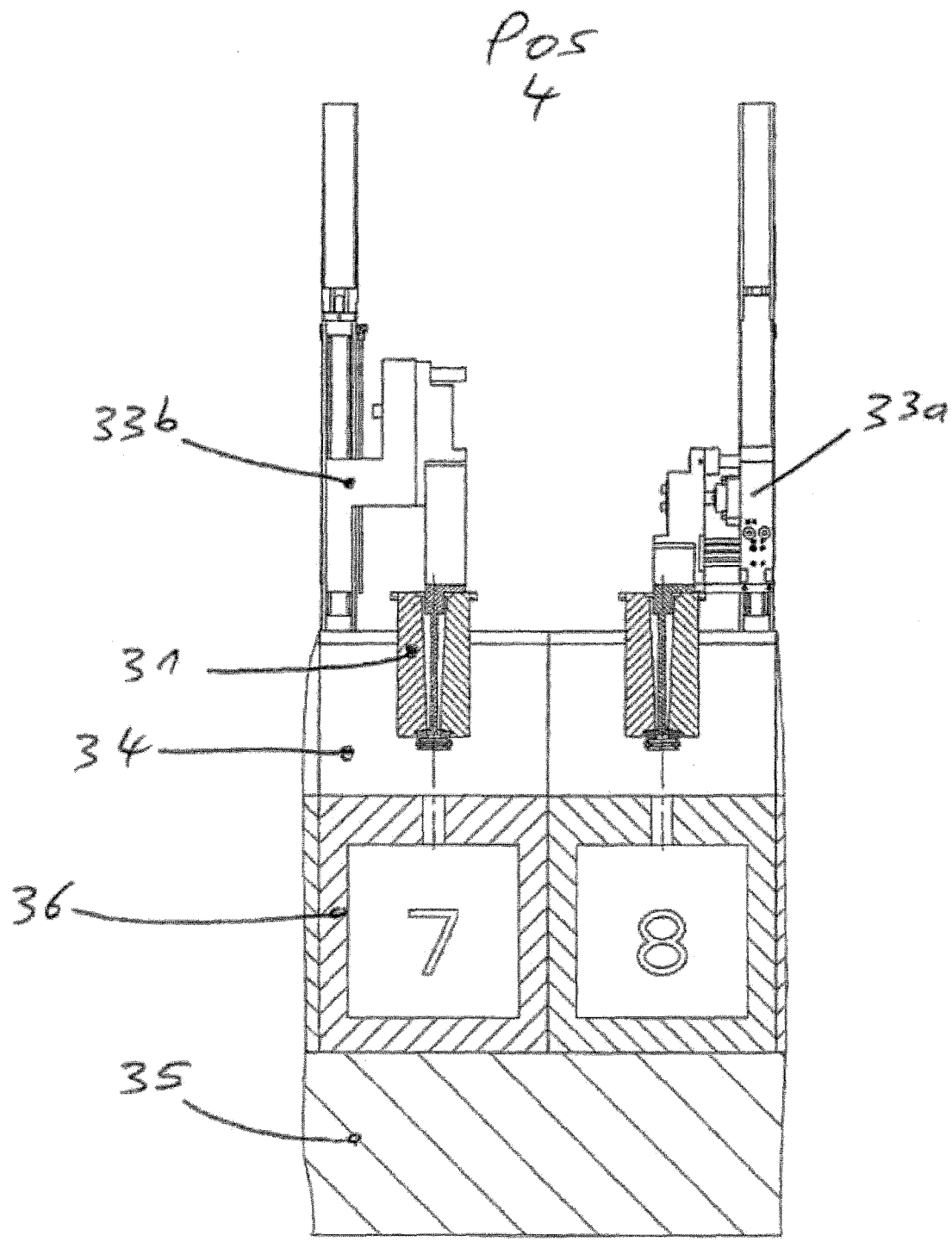

FIG. 21. Shows a detail view of sections 7+8 with spraying nozzles moved down vertically deeper between molds and between neck rings. Spraying, mold lubrication is off.

Figure 22:
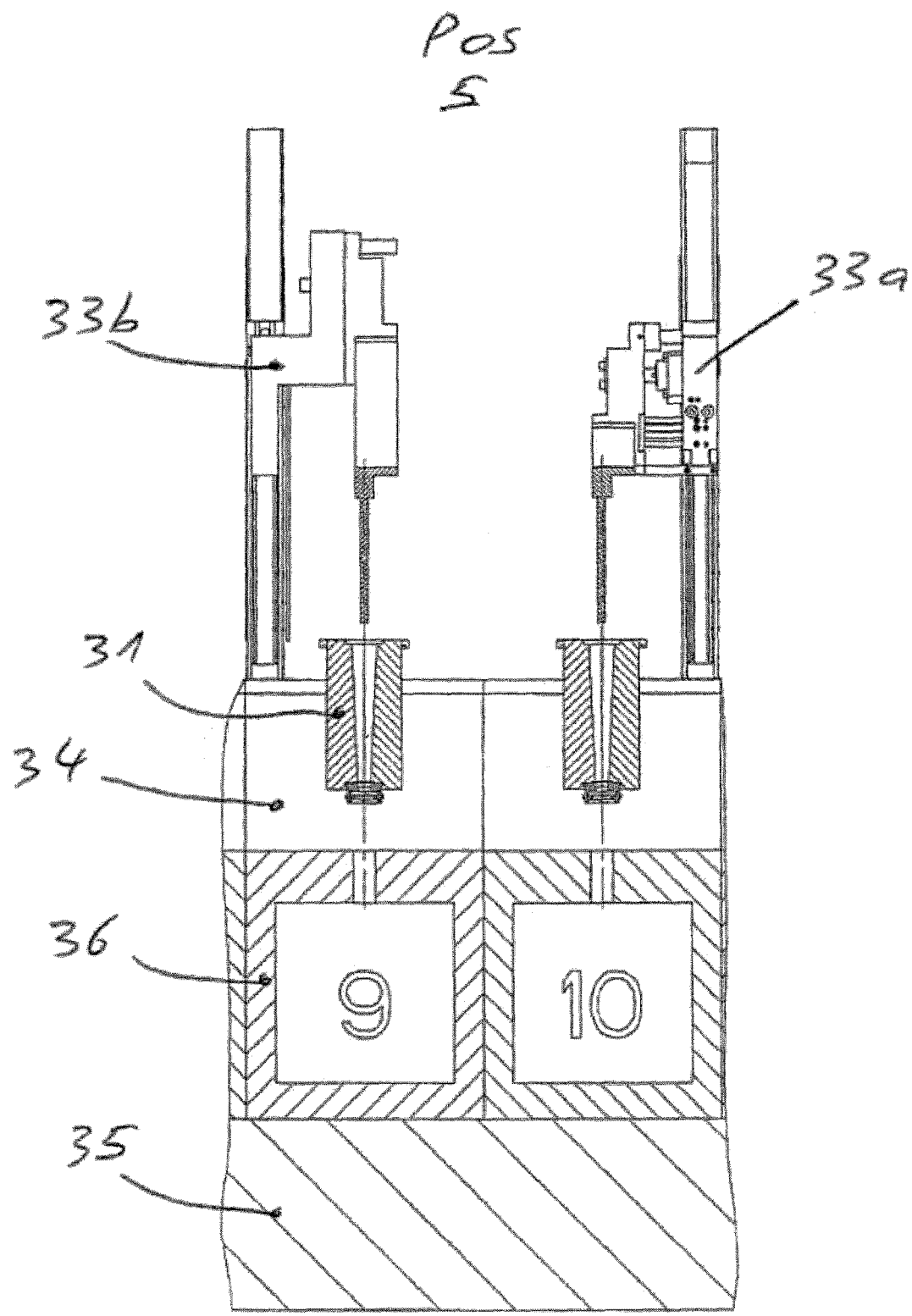

FIG. 22. Shows a detail view of sections 9+10 with spraying nozzles moved up vertically while spraying and lubricating neck rings and molds.

Figure 23:
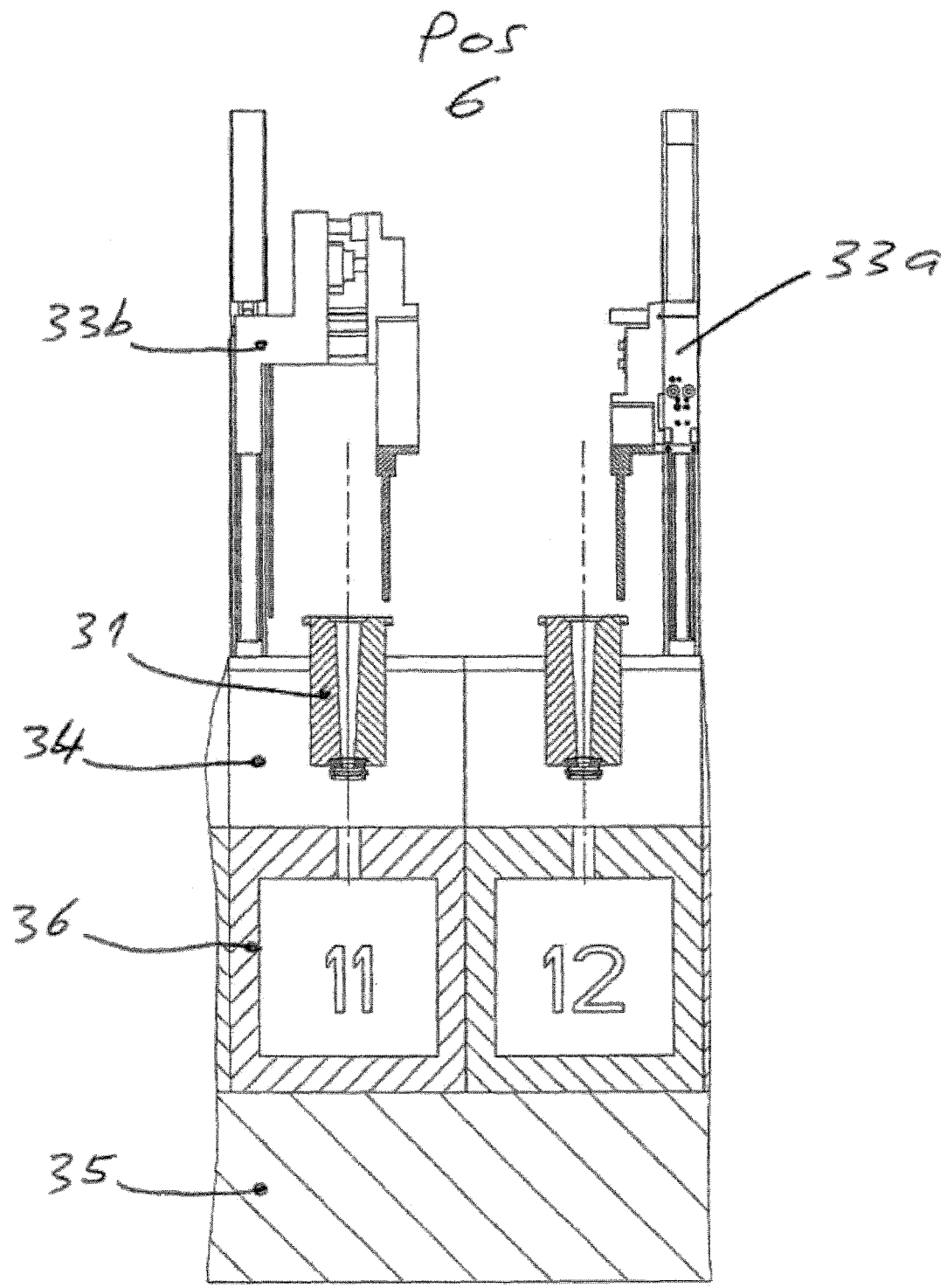

FIG. 23. Shows a detail view of sections 11+12 with spraying nozzles moved horizontally from the center of closed position of mold halves to the horizontal position of waiting position. Molds are in closed position. Spraying, mold lubrication is off.

Figure 24:
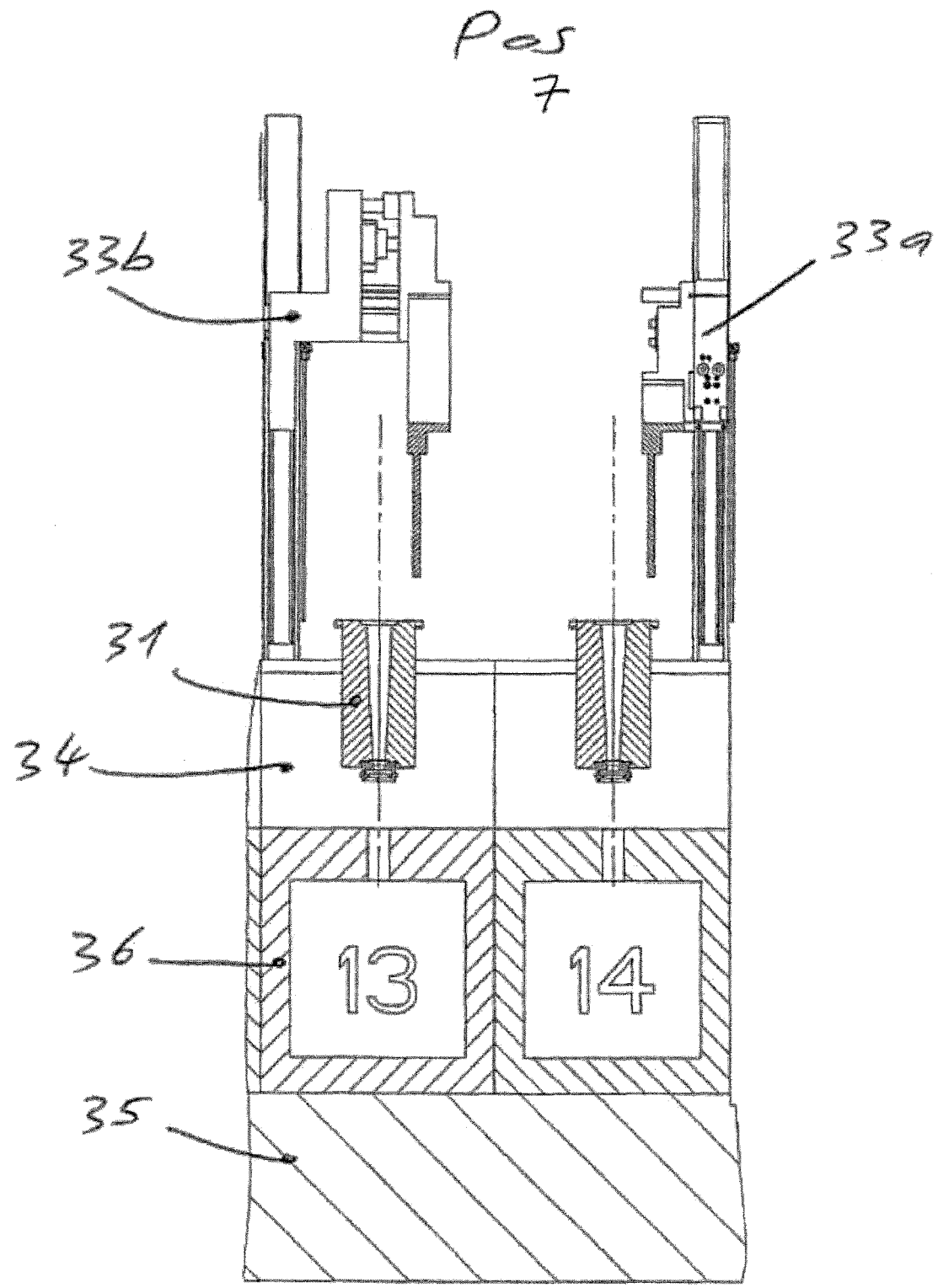

FIG. 24. Shows a detail view of sections 13+14 with spraying nozzles moved up vertically to waiting position. Spraying, mold lubrication is off.

DETAILED DESCRIPTION OF THE INVENTION

Description of the Methods and Devices for Lubricating Molds and Sucking Emissions (see FIGS. 1 to 11)

An arm 1 holding one or more spraying nozzles 2 moves on top of a mold 3 from a waiting position, for example as illustrated in FIG. 1, and is inserted between two mold halves 3a, 3b and/or neck rings 4. These steps are illustrated in FIGS. 2 and 4 where in FIG. 2 the nozzle 2 is aligned with the mold 3 and in FIG. 3 the nozzle 2 has been inserted in the mold 3.

FIG. 3 illustrates an embodiment with two molds (so called "double gob" embodiment) to demonstrate that the description with one single mold may be applied to configurations with several molds (i.e. two and more). The position illustrated in FIG. 3 corresponds to the one illustrated in FIG. 2 and the description of this figure applies correspondingly.

In FIG. 4 specifically, the nozzle 2 sprays lubricating media 5 onto the molds' 6 and necking's 7 inner surfaces while simultaneously moving up and/or down 8 or standing still.

The lubricating media 5 is fed by an external pumping system through rigid and/or flexible piping 9 and into the spraying nozzle 2. The lubricating media is continuously circulated in the system in order to avoid jams/blockage (nozzle+pump+valve+piping+tank etc. . . . ) and ensure constant mixing of the lubricating media media which contains solid particles (graphite).

FIG. 5 illustrates the configuration with two molds ("double gob" as in FIG. 3) and the description of FIG. 4 applies correspondingly.

Through a sucking nozzle 10, the emissions 11 generated by the mold lubricating process are sucked by a negative pressure 12 applied in the area where emissions can be sucked or recuperated. The suction 12 is for example generated by an external vacuum pump system or by negative pressure generated by a fan and through rigid and/or flexible piping 13 that connects the vacuum 12 to the sucking nozzle 10. Vacuuming or suction of emissions generated by the lubricating process, are carried out without applying a physical cover over the molds and without interfering with the gob loading path which is more efficient and creates less problems in the process.

After spraying the lubricating media 5, the arm 1 holding the spraying nozzle 2 moves back into a waiting position for example its initial position of FIG. 1. The arm 10 containing the sucking nozzle 14 goes into a position that permits gob 15 loading into the mold 3 as illustrated in FIG. 6. The same arm 10 sucks emissions 11 generated by gob 15 loading process.

FIG. 7 illustrates a front view as FIGS. 3 and 7 in a double gob configuration.

Once the gob 15 is loaded, the arm 10 containing the vacuum nozzle 14 goes into a waiting position that allows the continuation of the glass forming process, for example as illustrated in FIG. 1.

The sucking nozzle 10 may also be fixedly mounted onto the arm 1 holding one or more spraying nozzles 2 and moving with it or they may be independent from each other.

The sucking nozzle 10 may also be mounted in a fixed manner (for example on the machine or on the mold 3) in a position where emissions 11 can be sucked but is not disturbing continuation of the glass forming process according to the principle of the present invention (see FIGS. 4 and 6 for example).

Description of Lubricating Media Circulating System (FIGS. 8-13)

FIGS. 8, 9, 10 and 11 show the functioning of the spraying nozzle 2, FIGS. 8 and 9 being side cut views of the nozzle in two different positions and FIGS. 10 and 11 a detail of the end of the nozzle in said same two positions and the description is given below with reference to FIGS. 12 and 13 as well.

A pump 16 is pumping lubricating media from a storage tank 17 through a main supply line 18 and through lubricating media section supply line 19 into the spraying nozzles 2 used on the section 36. After the last spraying nozzle 2 on the section 36 the lubricating media 5 flows through a section lubricating media return line 21 and through the main return line 22 back into the lubricating media storage tank 17. Between section supply line 19 and section return line 21 a valve 23 is adapted to open and close the lubricating media return line 21. The valve 23 opens the return line 21 when spraying nozzle 2 is not spraying to allow recuperation of the lubricating media. The valve 23 closes the return line 21 when spraying nozzle 2 is spraying to build up the pressure in the supply line 19 for spraying. Main supply line 18 is under high pressure and main return line 22 is under low pressure.

A pneumatically actuated piston 24 moves the attached tube 28 in two positions as is now described, one position being illustrated in FIGS. 8/10 and the other in FIG. 9/11. When the tube 28 is pressed against the fix mounted needle 29, then the supply of lubricating media 5 to the nozzle exhaust 26 is blocked (see FIGS. 8 and 10) and, at the same time, the path of pressurized air 27 to the nozzle exhaust 26 opens as illustrated in FIGS. 8 and 10. In this situation, the nozzle 2 is de-activated and pressurized air 27 cleans and cools the nozzle exhaust 26, blowing out residual lubricating media 5 in a plenum 30 of the nozzle 2. No lubricating media exits the nozzle and it flows back into return line 21 as illustrated by the arrows in FIGS. 8 and 10.

When the tube 28 is pressed against nozzle head 32 by the pneumatically actuated piston 24, this situation being illustrated in FIGS. 9 and 11, then the the lubricating media 5 may reach the plenum 30 and may then ejected through the nozzle exhaust 26 and, at the same time, the pressurized air 27 is directed to the exhaust 26 (see in the right side of FIG. 11) and, there, it is mixed with the lubricating media 5 and sprayed onto the molds 31 in accordance with the principle of the present invention.

The piston 24 is actuated for example by air under pressure at inlets/outlets 25a and 25b. When air under pressure arrives through inlet 25a (FIG. 8), then piston is moved upwards thus closing the passage for the lubricating media (see FIG. 10) and 25b represents an outlet (see the direction of the arrow).

When air under pressure arrives at 25b which is used as an inlet, then the piston 24 is moved downwards as in FIGS. 9 and 11, thus liberating the passage for the lubricating media to exit in plenum 30 at exhaust 26 as illustrated in FIG. 11. In this case, 25a is an outlet as shown by the arrow in FIG. 9.

The air under pressure may be delivered by a pump for example or another equivalent device.

In FIGS. 12 and 13, the representations illustrate a machine with several sections, i.e. molds 3 and corresponding nozzles 2 (see the mentions "Section 01", "Section 02", "Section 03" and "Section nn", "nn" being the last section of the machine and the supply line 19 and return line 21 of FIG. 8 or 9 have here been referenced 19a, 21a, 19b, 21b, 19c, 21c and 19nn, 21nn. It should be understood that each line 19a-19nn and 21a-21nn corresponds to a line 19, respectively 21 of FIG. 8 or 9.

In order to evenly distribute the lubricating media 5 through an operating nozzle 2 at the nozzle exhaust 26 pressurized air 27 is applied for spraying the lubricating media 5 onto the molds 31 as illustrated in FIG. 11 and discussed above.

Description of how the Spraying Mechanisms are Attached to an IS Machine (FIGS. 14-24).

These figures illustrate several views of an IS machine with a plurality of sections (i.e. fourteen) each being with a double mold 31 (or pair) configuration as in FIGS. 3/5/7 described above. Hence, a pair of molds 31 correspond to the molds 3 of these FIGS. 3/5/7. The molds of sections 1-6 are open and the others of section 7-14 are closed (see in FIG. 15 for section 6).

Figure 15:
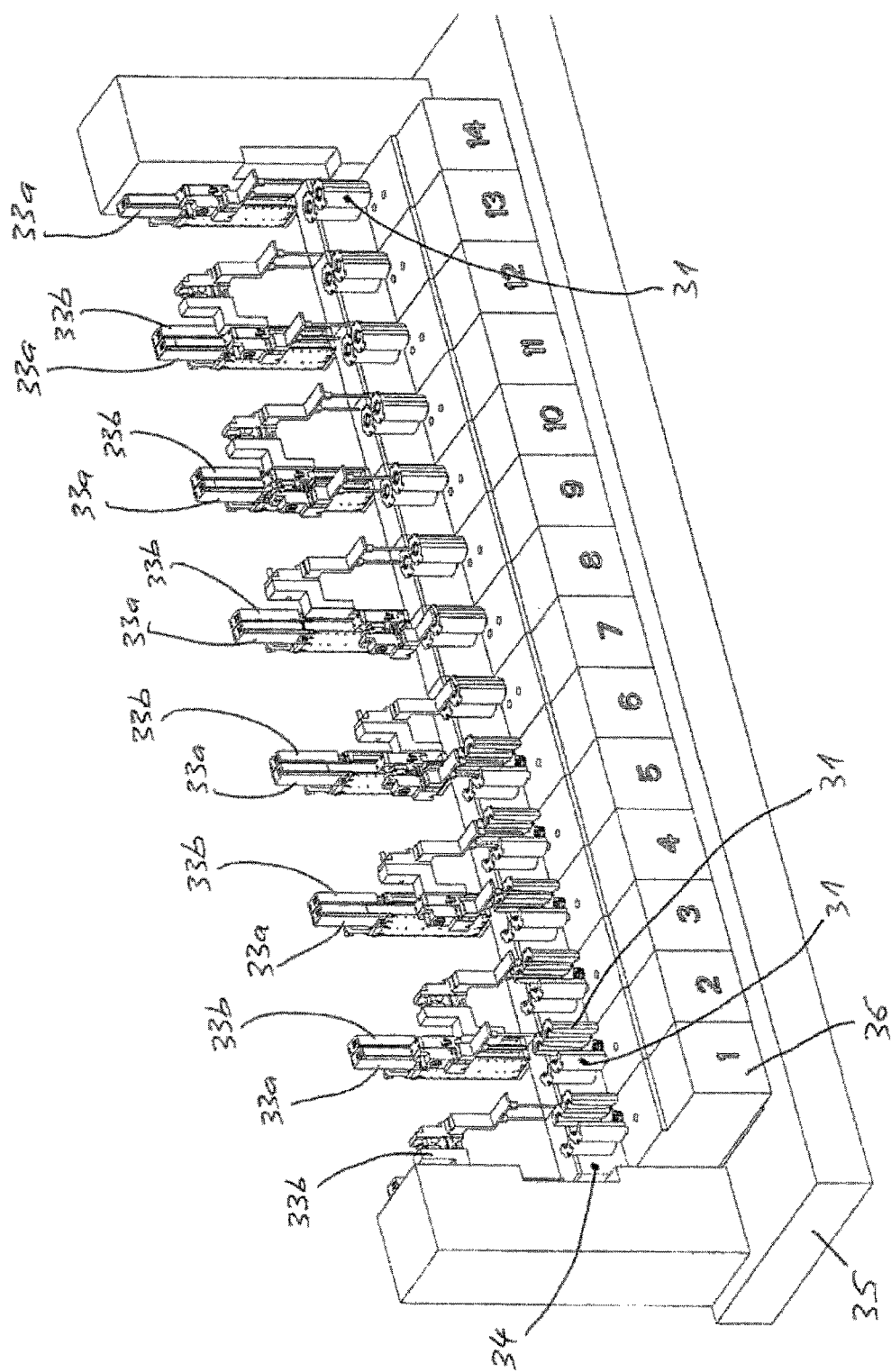

FIG. 15 shows a perspective view of the machine of FIG. 14 from the other side.

The spraying mechanisms 33a and 33b (one for each pair of molds 31 as illustrated in FIGS. 3/5/7 are mounted on, or next to, a blank bracket 34 of an IS machine 35 section 36, in left-handed and right-handed versions depending on which pair of mold 31 it has to act.

The IS machine 35 operates multiple sections 36 (1 to 14 in the FIGS. 14 and 15), each having a blank bracket 34 on (or next to) which either a left-handed spraying mechanism 33a or right-handed spraying mechanism 33b is mounted. In FIG. 15, one see that the end sections ("1" and "14") each only have one single spraying mechanism 33b (section "14") or 33a (section "1").

FIG. 16 is a front view taken from the same side as FIG. 14 and FIG. 17 a front view taken from the same side as FIG. 15.

Through this assembly method, a wide distance "X" between spraying mechanisms (33) is achieved (FIG. 16).

FIG. 16 shows the IS machine from the blank side with left-handed 33a and right-handed 33b versions of spraying mechanisms mounted. Sections with even numbers have a left-handed version of the spraying mechanism 33a mounted on the sections. Uneven numbered sections have a right-hand version 33b of the spraying mechanism mounted. This figure also shows the wide distance "X" between two neighboring lubricating mechanisms when using left-handed and right-handed versions of lubricating mechanisms.

FIG. 17 shows a cross section through blank molds of an IS machine from "inside" with spraying mechanisms mounts. It shows a lubricating cycle step by step. Left-handed 33a and right-handed 33b mechanisms of neighboring sections are in the same working position:

sections "1"+"2", position 1 ("Pos. 1" in FIG. 17) the lubricating mechanisms 33b and 33a are in a high position, for example as illustrated in FIG. 1 or 2, with open molds 31;

sections "3"+"4", position 2 ("Pos. 2" in FIG. 17) the lubricating mechanisms 33b and 33a are in a low position, for example as illustrated in FIG. 4;

sections "5"+"6", position 3 ("Pos. 3" in FIG. 17) the lubricating mechanisms 33b and 33a are in a low position, for example as illustrated in FIG. 4 but centered in the molds 31 which are still open;

sections "7"+"8", position 4 ("Pos. 4" in FIG. 17) the lubricating mechanisms 33b and 33a are in a low position, for example as illustrated in FIG. 4 or 5 but centered in the molds 31, the molds being closed so that the lubricating operation may take place;

sections "9"+"10", position 5 ("Pos. 5" in FIG. 17) the lubricating mechanisms 33b and 33a are in a high position, for example as illustrated in FIG. 2 or 3 but out of the molds 31. Typically this position is reached once the lubricating operation is finished;

sections "11"+"12", position 6 ("Pos. 6" in FIG. 17) the lubricating mechanisms 33b and 33a are in a high position and moved to the side, for example as illustrated in FIG. 1;

sections "13"+"14", position 7 ("Pos. 7" in FIG. 17) the lubricating mechanisms 33b and 33a are in a high position and moved to the side, for example as illustrated in FIG. 6. Typically this position is reached once the lubricating operation is finished and the gobs are going to be loaded into the molds 31.

FIG. 18 shows a detail view of sections "1"+"2" with spraying nozzles in waiting position. Spraying, mold lubrication is off and this corresponds to the position 2 mentioned above and illustrated in FIG. 17.

FIG. 19 shows a detail view of sections "3"+"4" with spraying nozzles moved down vertically between molds. Spraying, mold lubrication is off and this corresponds to the position 2 mentioned above and illustrated in FIG. 17.

FIG. 20 shows a detail view of sections "5"+"6" with spraying nozzles moved horizontally to the center of closed position of mold halves. Molds are in open position. Spraying, mold lubrication is off and this corresponds to the position 3 mentioned above and illustrated in FIG. 17.

FIG. 21 shows a detail view of sections "7"+"8" with spraying nozzles moved down vertically deeper between molds and between neck rings. Spraying and mold lubrication is off this corresponds to the position 4 mentioned above and illustrated in FIG. 17.

FIG. 22 shows a detail view of sections "9"+"10" with spraying nozzles have been moved up vertically while spraying and lubricating neck rings and molds this corresponds to the position 5 mentioned above and illustrated in FIG. 17.

FIG. 23 shows a detail view of sections "11"+"12" with spraying nozzles moved horizontally from the center of closed position of mold halves to the horizontal position of waiting position. Molds are in closed position. Spraying, mold lubrication is off this corresponds to the position 6 mentioned above and illustrated in FIG. 17.

FIG. 24 shows a detail view of sections "13"+"14" with spraying nozzles moved up vertically to a waiting position. Spraying, mold lubrication is off this corresponds to the position 7 mentioned above and illustrated in FIG. 17.

Of course, the embodiments given in the present specification are non-limitative illustrative examples and equivalent means are possible within the frame of the present invention. Also, embodiments of the present invention may be combined together and adapted to the circumstances.

The invention claimed is:

1. A method for lubricating a glass forming mold with a nozzle, the nozzle for spraying a lubricating media into the mold, the method comprising the steps of:
displacing a nozzle from a resting position to a working position into the mold;
moving the nozzle in the mold while spraying a lubricating media to lubricate an inner surface of the mold;
applying a vacuum at least during the moving and spraying step to evacuate emissions;
displacing the nozzle to a resting position allowing a loading of a gob in the mold, once the mold has been lubricated; and
circulating the lubrication media in the nozzle before and after the moving and spraying step for at least one of avoiding stagnant lubrication media remaining in the nozzle and ensure constant mixing of solid particles in the lubrication media.

2. The method as defined in claim 1, wherein the lubricating media is sprayed with air under pressure.

3. The method as defined in claim 1, wherein the moving and spraying step is performed while moving the nozzle upwards or downwards or in a combination of both directions.

4. The method as defined in claim 1, wherein the lubricating media is sprayed with a gas under pressure having flame retardant characteristics.

5. The method as defined in claim 1, further comprising the step of:
blowing out residues of lubricating media remaining in the nozzle with air under pressure, the blowing step preventing intrusion of foreign particles and allowing a cooling of the nozzle.

6. The method as defined in claim 1, wherein during the loading of the gob in the mold, a vacuum is applied.

7. A nozzle for lubricating a glass forming mold, comprising:
a supply line and a return line for lubrication media;
a nozzle head with an exhaust for spraying of the lubrication media; and
a piston configured to move to a first and a second position,
wherein in the first position, the piston closes the nozzle head for the lubricating media so that the lubricating media remains in a closed circuit in the nozzle between the supply line and the return line, and
wherein in the second position, the piston opens the nozzle head for the lubricating media so that the nozzle is configured to spray the lubricating media in the mold.

8. The nozzle as defined in claim 7, further comprising:
an air supply for cleaning and cooling the nozzle head.

9. The nozzle as defined in claim 7, wherein the air supply is used for a spraying operation of the lubricating media.

10. The nozzle as defined in claim 7, wherein the piston is displaced to the first and second positions by air under pressure.

11. A spraying mechanism of an individual section machine comprising a nozzle as defined in claim 7.

12. The spraying mechanism as defined in claim 11, wherein the mechanism is left-handed or right handed.

13. An IS machine for forming glass containers comprising:
a spraying mechanism having a nozzle including,
a supply line and a return line for lubrication media,
a nozzle head with an exhaust for spraying of the lubrication media, and
a piston configured to move to a first position and a second position,
wherein in the first position, the piston closes the nozzle head for the lubricating media so that the lubricating media remains in a closed circuit in the nozzle between the supply line and the return line, and
wherein in the second position, the piston opens the nozzle head for the lubricating media so that the nozzle is configured to spray the lubricating media in a mold.

14. The IS machine as defined in claim 13, wherein the spraying mechanism is arranged to be at least one of left-handed and right handed and mounted in an alternate sequence in each section of the IS machine to increase a neighboring distance between each spraying mechanism.

* * * * *